United States Patent
Chang et al.

(10) Patent No.: US 12,474,241 B2
(45) Date of Patent: Nov. 18, 2025

(54) 3D IMAGE REGISTRATION VIA DENSE STAINING AND SUPER-RESOLUTION MULTIPLEXED IMAGING METHOD USING THE SAME

(71) Applicant: Korea Advanced Institute Of Science And Technology, Daejeon (KR)

(72) Inventors: Jae-Byum Chang, Daejeon (KR); In Cho, Daejeon (KR); Chan E Park, Daejeon (KR); Jueun Sim, Daejeon (KR); Young-Gyu Yoon, Daejeon (KR)

(73) Assignee: Korea Advanced Institute Of Science And Technology, Daejeon (KR)

(*) Notice: Subject to any disclaimer, the term of this patent is extended or adjusted under 35 U.S.C. 154(b) by 777 days.

(21) Appl. No.: 17/675,808

(22) Filed: Feb. 18, 2022

(65) Prior Publication Data
US 2022/0268672 A1   Aug. 25, 2022

(30) Foreign Application Priority Data

Feb. 24, 2021   (KR) .................. 10-2021-0024480
Oct. 18, 2021   (KR) .................. 10-2021-0138718
(Continued)

(51) Int. Cl.
*G01N 1/30*   (2006.01)
*G06T 7/33*   (2017.01)

(52) U.S. Cl.
CPC .............. *G01N 1/30* (2013.01); *G06T 7/337* (2017.01); *G01N 2001/302* (2013.01);
(Continued)

(58) Field of Classification Search
CPC .... G01N 1/30; G01N 2001/302; G06T 7/337; G06T 2200/04; G06T 2207/10056;
(Continued)

(56) References Cited

U.S. PATENT DOCUMENTS 10,317,321 B2 *   6/2019   Tillberg ............... G01N 1/36
2011/0074944 A1 *  3/2011   Can ..................... G06T 5/50
                                                           382/128
(Continued)

FOREIGN PATENT DOCUMENTS

CN   110006862 A    7/2019
JP   2013506129 A   2/2013
WO   2019241662 A1  12/2019

OTHER PUBLICATIONS

Klevanski et al. "Automated highly multiplexed super-resolution imaging of protein nano-architecture in cells and tissues." Nature communications 11.1:1552 (2020) pp. 1-11.

*Primary Examiner* — Amandeep Saini
*Assistant Examiner* — Emma Rose Goebel
(74) *Attorney, Agent, or Firm* — NIXON PEABODY LLP

(57) ABSTRACT

Disclosed are three-dimensional image registration via dense staining and a super-resolution multiplexed imaging method using the same. The three-dimensional image registration includes: placing at least one fiducial marker in an internal structure of a biological sample via dense staining; obtaining a plurality of images by repeatedly imaging the biological sample while replacing a fluorescent label attached to at least one target molecule within the biological sample where the fiducial marker is placed; and registering the images using the fiducial marker as a reference to obtain a final image of the target molecule.

7 Claims, 26 Drawing Sheets

(30) Foreign Application Priority Data

Jan. 21, 2022 (KR) .......................... 10-2022-0009372
Jan. 24, 2022 (KR) .......................... 10-2022-0010077
Jan. 24, 2022 (KR) .......................... 10-2022-0010078

(52) U.S. Cl.
CPC .............................. *G06T 2200/04* (2013.01); *G06T 2207/10056* (2013.01); *G06T 2207/30204* (2013.01)

(58) Field of Classification Search
CPC . G06T 2207/30204; G06T 2207/30024; G06T 7/33
See application file for complete search history.

(56) References Cited

U.S. PATENT DOCUMENTS

| | | | |
|---|---|---|---|
| 2020/0167924 A1* | 5/2020 | Wang | G06V 20/69 |
| 2021/0255072 A1* | 8/2021 | Zhao | G01N 1/36 |
| 2023/0132184 A1* | 4/2023 | M'Saad | G01N 1/31 73/863 |

* cited by examiner

3D IMAGE REGISTRATION VIA DENSE STAINING AND SUPER-RESOLUTION MULTIPLEXED IMAGING METHOD USING THE SAME

CROSS-REFERENCES TO RELATED APPLICATION

This application is based on and claims priority under 35 U.S.C. 119 to Korean Patent Application Nos. 10-2021-0024480, filed on Feb. 24, 2021, 10-2021-0138718, filed on Oct. 18, 2021, 10-2022-0009372, filed on Jan. 21, 2022, 10-2022-0010077, filed on Jan. 24, 2022, and 10-2022-0010078, filed on Jan. 24, 2022 in the Korean Intellectual Property Office, the disclosures of which are herein incorporated by reference in its entirety.

TECHNICAL FIELD

Various embodiments relate to a novel technology for dramatically improving the accuracy of image registration by placing a fiducial marker as a structure within a tissue via dense staining, rather than within the nucleus of a cell, in a process of image registration which takes place during multiplexing.

BACKGROUND OF THE INVENTION

Generally, in order to achieve super-resolution multiplexed imaging, an antibody with a fluorescent molecule or a DNA probe is attached to a biological specimen to obtain an image, and then the attached antibody or DNA probe is detached and an antibody or DNA probe for probing another marker is attached to repeatedly obtain an image from the same place. Afterwards, the obtained images are registered using DAPI or a fluorescent protein expressed in a biological specimen, and then the images of each marker are overlaid to form a single composite image, thereby achieving multiplexed imaging.

However, the repeated attaching of antibody and DNA probe may cause a non-linear, nanometer deformation within a biological specimen. That is, generally in the case of cell nuclei used as a fiducial marker for image registration, the accuracy of image registration is low in a tissue structure where cell nuclei are not densely packed, because of non-linear deformities of specimens caused by physical factors which occur during repeated labeling and sampling mounting.

SUMMARY

This summary is provided to introduce a selection of concepts in a simplified form that are further described below in the Detailed Description. This summary is not intended to identify key features of the claimed subject matter, nor is it intended to be used as an aid in determining the scope of the claimed subject matter.

This disclosure provides an imaging method for observing biological structure information of an expanded whole organism at super-high resolution.

This disclosure provides a technology involving optimization of high-density chemical labeling and optimization of expansion microscopy of vertebrates using chemical labeling.

This disclosure provides a technology that provides an image registration accuracy of around 10 nm by placing fiducial markers for more packed image registration via dense staining in which signal deformation does not occur during repeated antibody and DNA probe labeling.

An imaging method according to the present disclosure comprises: synthesizing a hydrogel-sample complex from an organism sample: digesting the hydrogel-sample complex; decalcifying the hydrogel-sample complex; expanding the hydrogel-sample complex; and imaging the expanded organism sample using the hydrogel-sample complex.

A method of optimizing chemical staining and expansion imaging according to the present disclosure comprises: staining a target molecule within a biological sample by using a hydrophilic fluorescent material and a hydrophobic fluorescent material together; and imaging the biological sample.

A three-dimensional image registration method according to the present disclosure comprises: placing at least one fiducial marker in an internal structure of a biological sample via dense staining; obtaining a plurality of images by repeatedly imaging the biological sample while replacing a fluorescent label attached to at least one target molecule within the biological sample where the fiducial marker is placed; and registering the images using the fiducial marker as a reference.

Various embodiments may dramatically improve the accuracy of image registration by using a densely stained structure as a fiducial marker, when applying a sequential staining process to expansion microscopy. In other words, various embodiments may achieve an image registration accuracy of around 10 nm by placing fiducial markers for more packed image registration via dense staining in which signal distortion does not occur during repeated antibody and DNA probe labeling. Accordingly, various embodiments allow for effective super resolution multiplexed imaging with improved accuracy.

DESCRIPTION OF THE DRAWINGS

The foregoing aspects and many of the attendant advantages of this invention will become more readily appreciated as the same become better understood by reference to the following detailed description, when taken in conjunction with the accompanying drawings, wherein.

DETAILED DESCRIPTION

While illustrative embodiments have been illustrated and described, it will be appreciated that various changes can be made therein without departing from the spirit and scope of the disclosure.

Hereinafter, various embodiments of the present disclosure will be described with reference to the accompanying drawings.

First embodiments of the present disclosure provide an imaging method for observing biological structure information of an expanded whole organism at super high resolution.

According to these embodiments, a technique of uniformly expanding the whole body of a vertebrate with strong bones to four times or more the initial size was developed by introducing a novel chemical treatment process into expansion microscopy. In the present embodiments, this technology was applied to two vertebrate models (juvenile zebrafish and mouse embryos) most frequently used as model animals for disease research and drug screening, and it was demonstrated that the whole bodies of the two types of vertebrates could be uniformly expanded to four times or more the initial size. The vertebrates thus expanded can be clearly observed with a typical confocal microscope—even a biological structure that cannot be accurately observed because, before expansion, it is smaller than 250 nm, which is a resolution for microscopes. Through this, the whole body of a vertebrate can be observed at 60 nm resolution with a typical microscope.

Expansion microscopy was developed in 2015 to expand a cellular or tissue section by synthesizing a highly-expandable hydrogel within a cultured cell or tissue section and then expanding this hydrogel. In this instance, homogenization is introduced which decomposes proteins within the cell and tissue using protein-degrading enzymes, in order to uniformly expand the cell or tissue. This expansion microscopy has been successfully applied to tissue sections that are several tens of nanometers thick, but was not able to expand the whole body of a vertebrate with strong bones inside it. In the present embodiments, a chemical treatment process for removing bones and a chemical treatment process for uniformly expanding a bone-hydrogel complex were introduced into expansion microscopy, succeeding in uniformly expanding the whole body of a vertebrate for the first time in the world.

Figure 1:
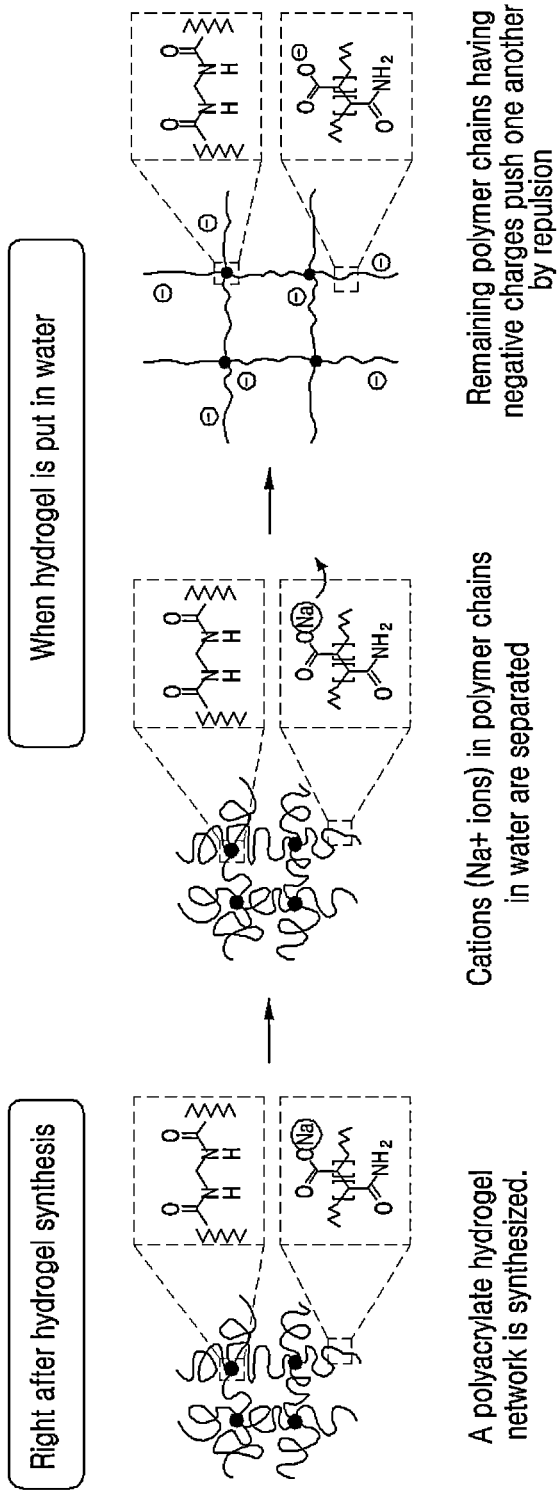
FIG. 1 is a view for explaining the principle of hydrogel expansion in an expansion microscope.
Figure 2:
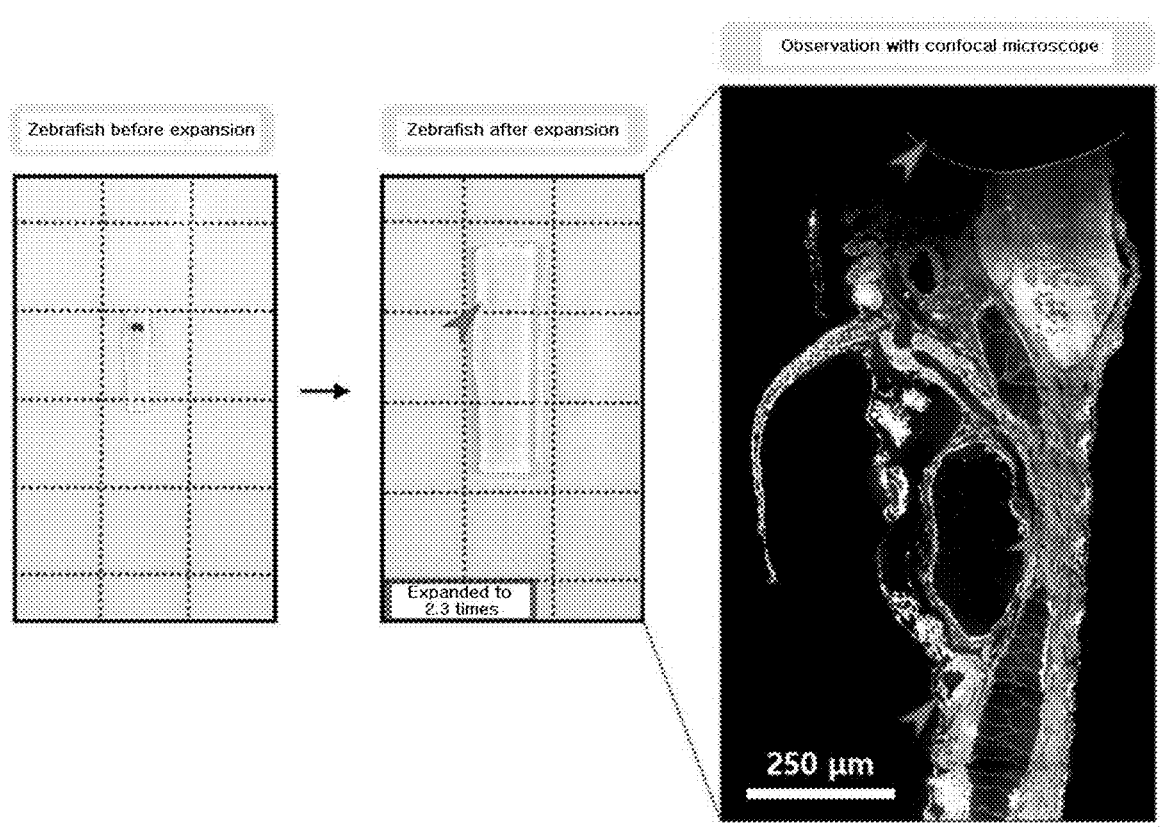
FIG. 2 is a view showing results from direct application of expansion microscopy to a vertebrate.
Figure 3:
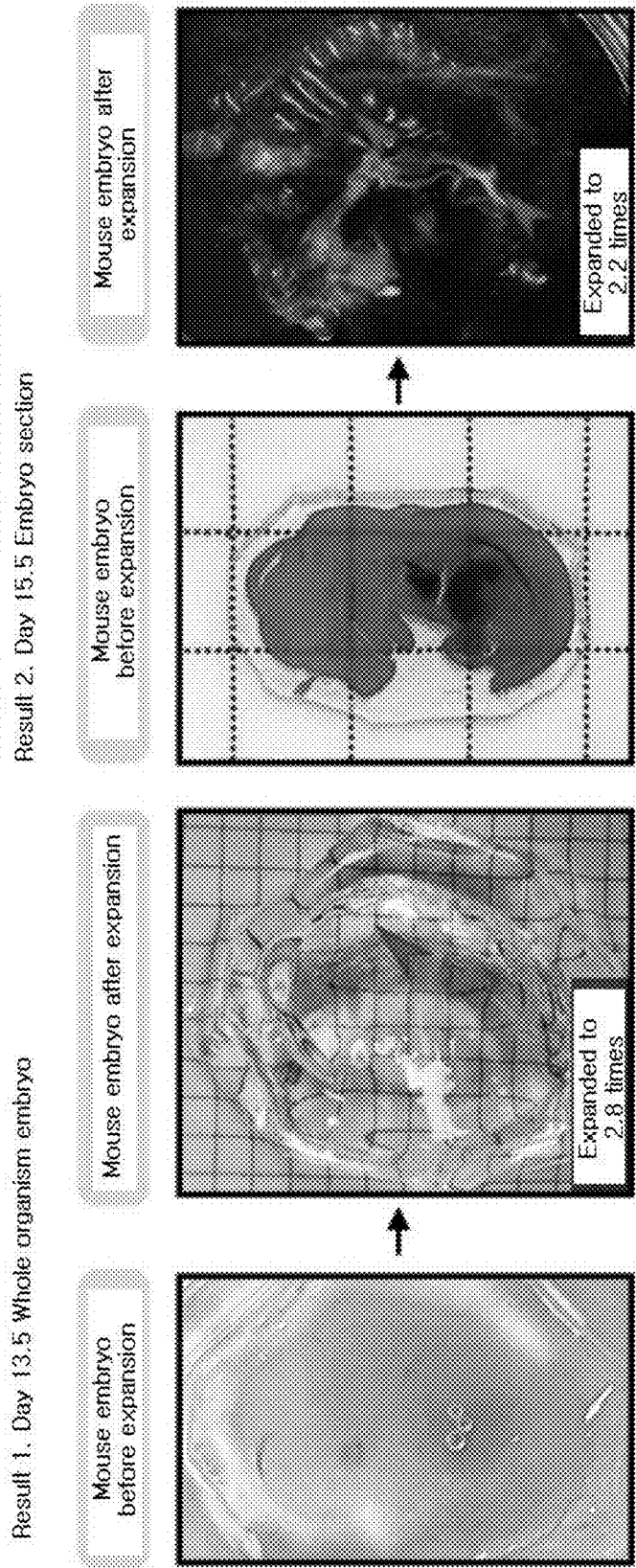
FIG. 3 is a view showing results obtained by applying expansion microscopy to a vertebrate in combination with a decalcification process.

FIG. 1 is a view for explaining the principle of hydrogel expansion in an expansion microscope. FIG. 2 is a view showing results from direct application of expansion microscopy to a vertebrate. FIG. 3 is a view showing results obtained by applying expansion microscopy to a vertebrate in combination with a decalcification process.

Referring to FIG. 1, the expansion microscope uses a hydrogel prepared by polymerizing sodium acrylate. After hydrogel synthesis, when this hydrogel is put in water, then the polymer chains in the hydrogel therefore have negative charges as sodium cations are separated from the polymer backbone of the hydrogel, and the polymer chains become straight by the repulsive forces between the negative charges. In this process, the hydrogel absorbs water and expands. However, when this hydrogel was applied directly to a vertebrate, for example, juvenile zebrafish, the juvenile zebrafish expanded to only 2.3 times, as shown in FIG. 2, a figure far below 4 which is a normal expansion coefficient of hydrogels. Also, it was observed that the bones and cartilage, which are relatively stronger than peripheral tissues, were disturbing uniform expansion of tissue, with the eyes and head of the juvenile zebrafish being gone, and with muscles attached to the bones getting distorted and torn.

To solve this problem, a decalcification process was introduced to expand a vertebrate's ossified tissue large enough. First, a method of treating a chemically fixed sample of a vertebrate with 0.5 M EDTA (ethylenediaminetetraacetic acid) according to an approach widely used in histology was attempted. A decalcified sample formed a complex with a hydrogel and expanded after being treated several times with protein-degrading enzymes. However, according to the method in which decalcification takes place before hydrogen synthesis, the juvenile zebrafish sample expanded to no more than about 2.7 times, and the mouse embryo sample expanded to no more than about 2.8 times. Increasing the EDTA treatment time to 3 weeks did not achieve a higher expansion coefficient. It was not possible to uniformly expand a vertebrate only by directly applying the existing expansion microscopy or combining a decalcification process with expansion microscopy.

In view of this, the present embodiments provide an approach in which decalcification takes place after a digestion process using protein-degrading enzymes.

Figure 4:
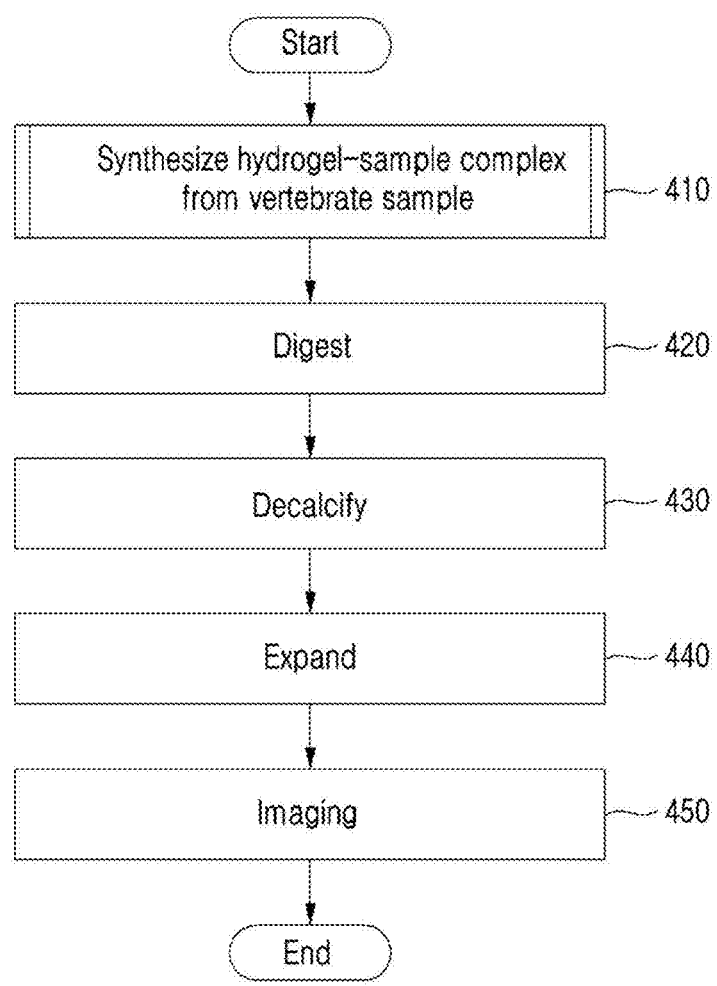
FIG. 4 is a view illustrating an imaging method according to first embodiments of the present disclosure.
Figure 5:
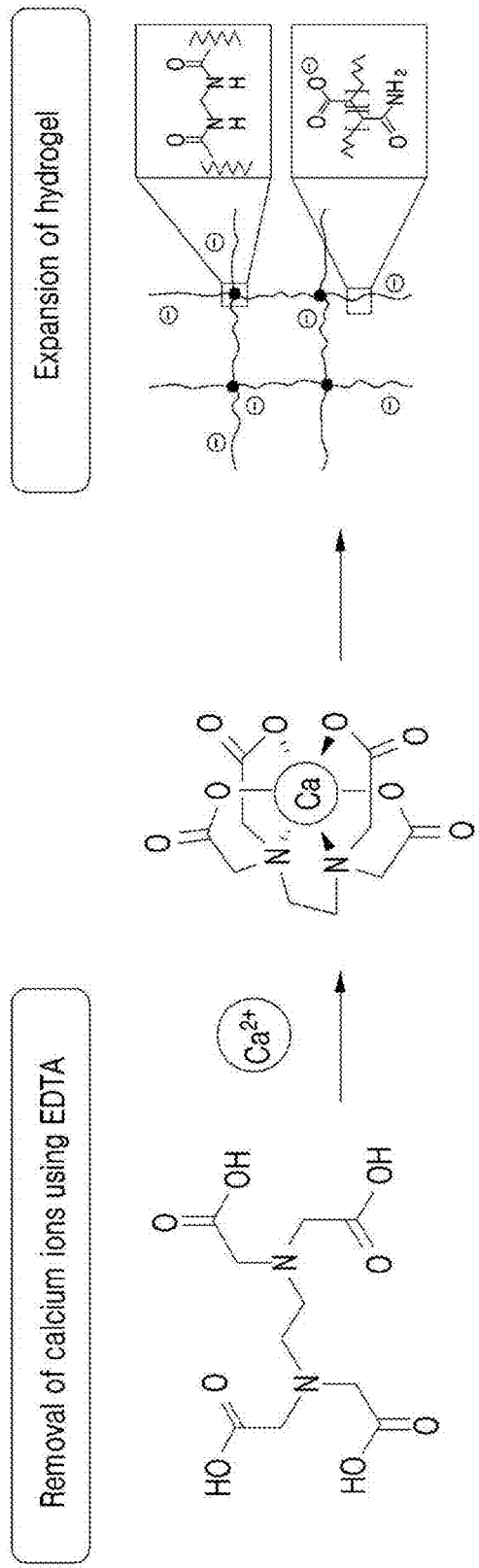
FIG. 5 is a view for explaining the principle of expansion of a vertebrate through decalcification treatment according to the first embodiments of the present disclosure.

FIG. 4 is a view illustrating an imaging method according to first embodiments of the present disclosure. FIG. 5 is a view for explaining the principle of expansion of a vertebrate through decalcification treatment according to the first embodiments of the present disclosure.

Referring to FIG. 4, in step 410, a hydrogel-sample complex is synthesized from a vertebrate sample. According to an embodiment, the hydrogel-sample complex is synthesized without the vertebrate sample undergoing a decalcification process. According to another embodiment, the hydrogel-sample complex is synthesized after the vertebrate sample undergoes the decalcification process. In this case, calcium in the bones of the vertebrate sample is removed.

Next, in step 420, the hydrogel-sample complex is digested using using protein-degrading enzymes. Afterwards, in step 430, decalcification treatment using a decalcifying solution is performed on the hydrogel-sample complex. In other words, in various embodiments, decalcification treatment is performed after digestion treatment. For example, the decalcifying solution may include EDTA. In some embodiments, the decalcifying solution contains sodium chloride, and the sodium chloride serves to prevent the hydrogel-sample complex from expanding before calcium ions are completely removed through decalcification.

Next, in step 440, the hydrogel-sample complex expands. Specifically, as illustrated in FIG. 5, the polymer chains in the hydrogel have negative charges through decalcification treatment, and, when the hydrogel-sample complex is put into water, the polymer chains become straight by the repulsive forces between the negative charges. In this process, the hydrogel-sample complex expands as it absorbs. As such, the vertebrate sample expands uniformly over the entire part.

Accordingly, in step 450, the entire vertebrate sample may be imaged with a typical microscope. That is, super-high-resolution molecular imaging of the whole body of a vertebrate may be performed with a typical microscope.

Figure 6:
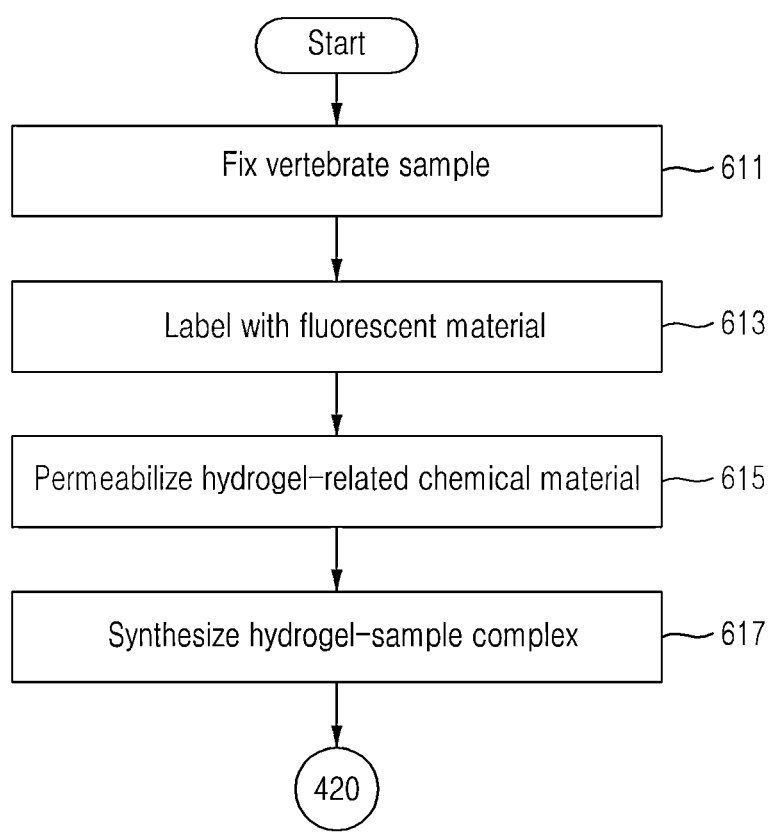
FIG. 6 is a view illustrating in detail a hydrogel-sample complex synthesis step of an imaging method according to an embodiment.
Figure 7:
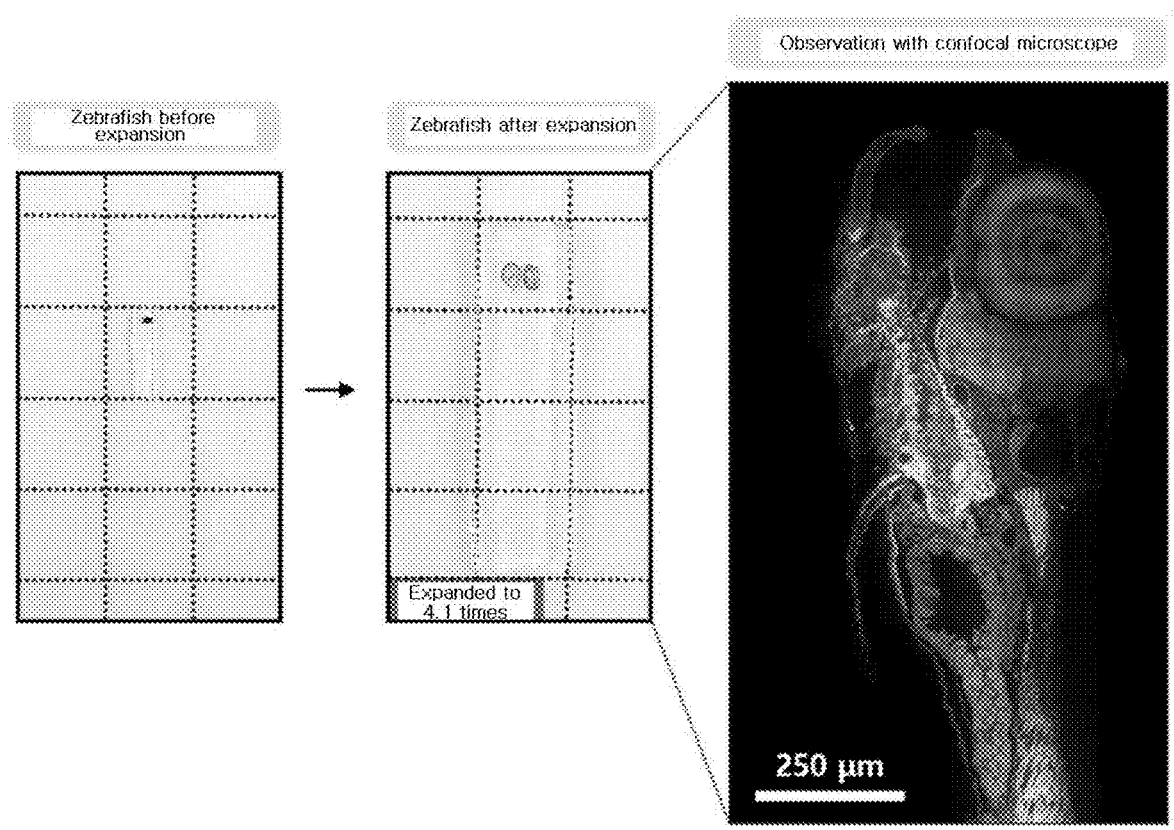
FIG. 7 is a view showing results of expansion of a vertebrate through decalfication treatment according to an embodiment.
Figure 8:
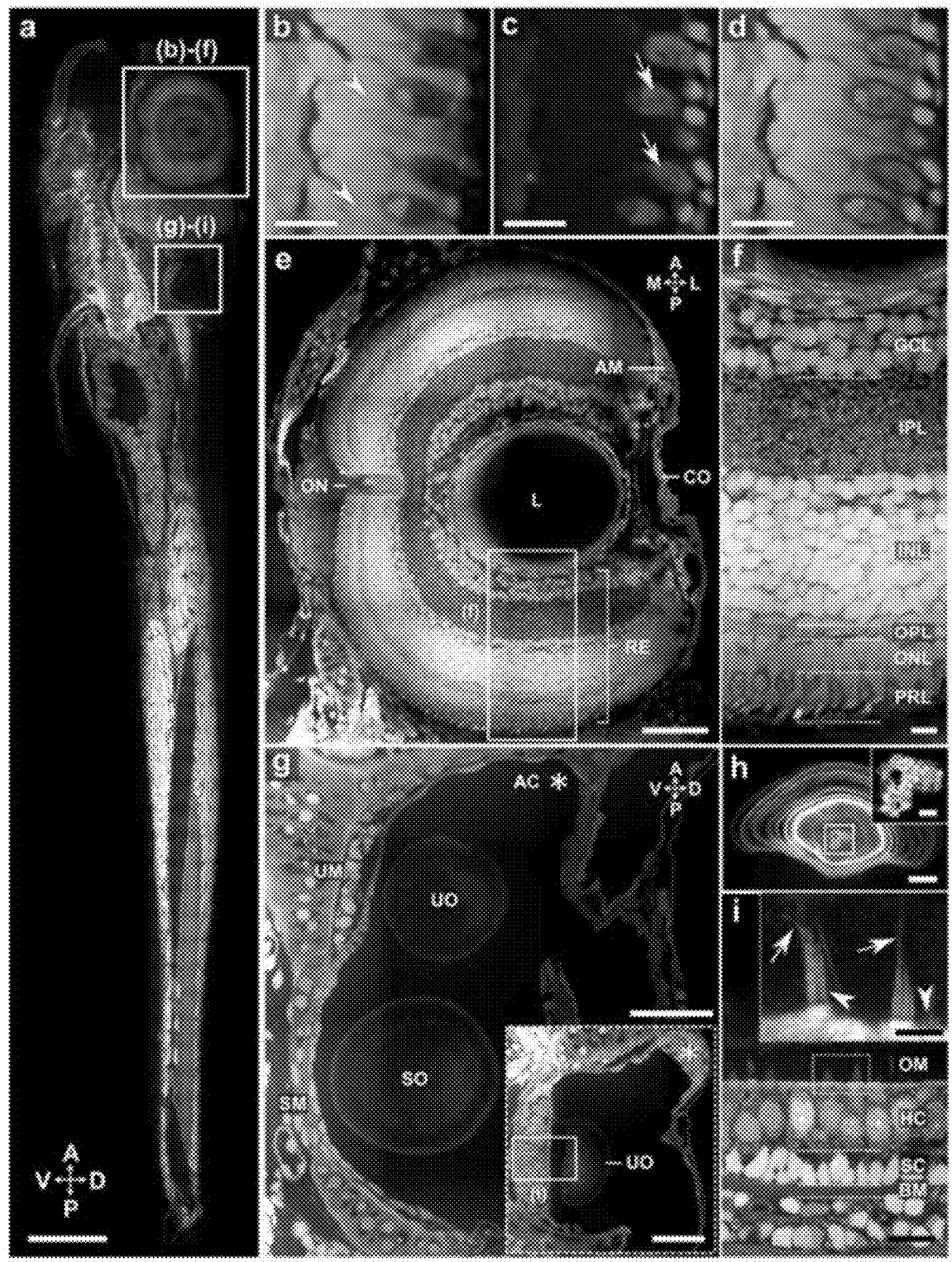
FIGS. 8, 9, and 10 are views showing results of imaging of an expanded vertebrate.
Figure 9:
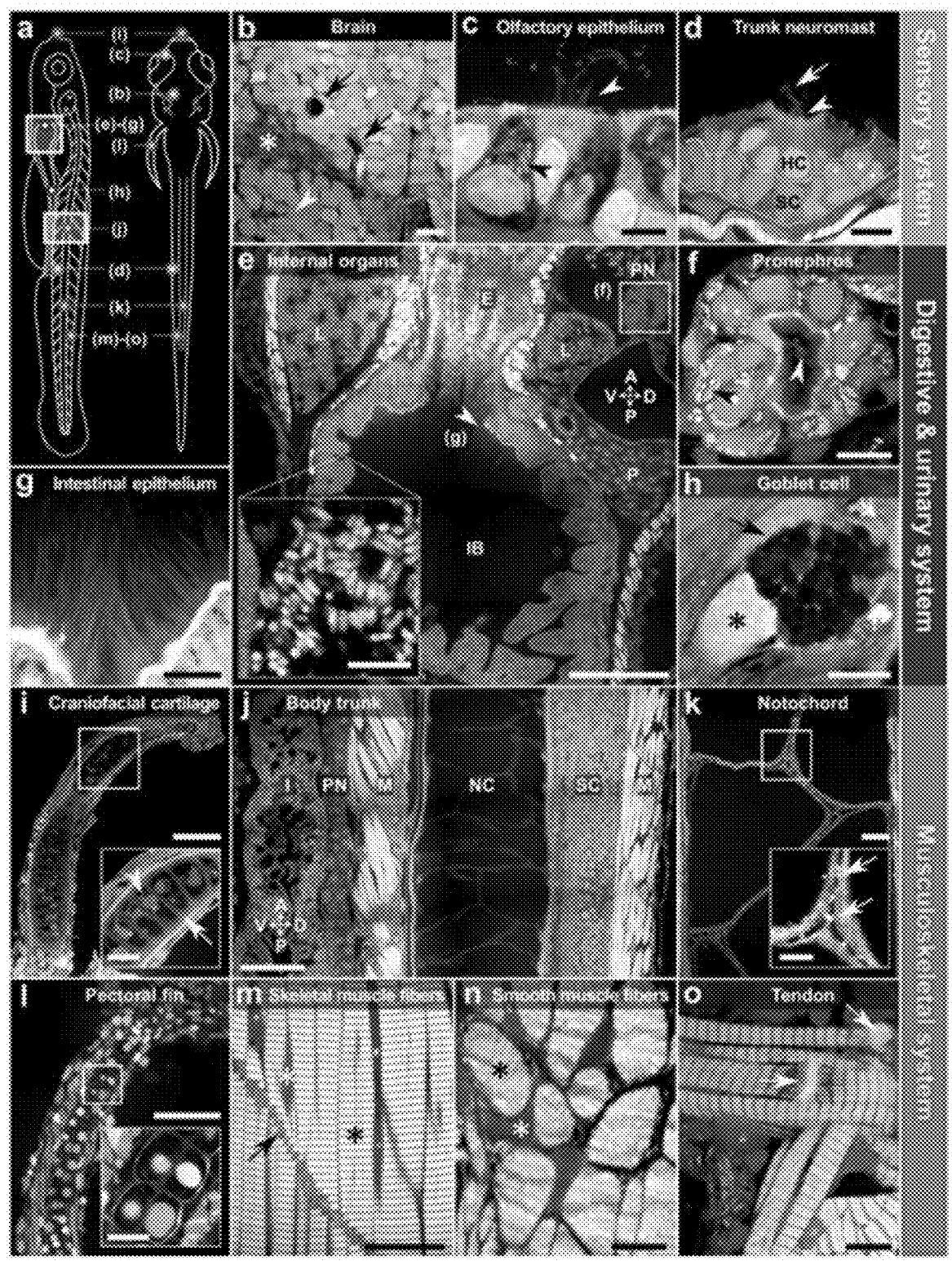
Figure 10:
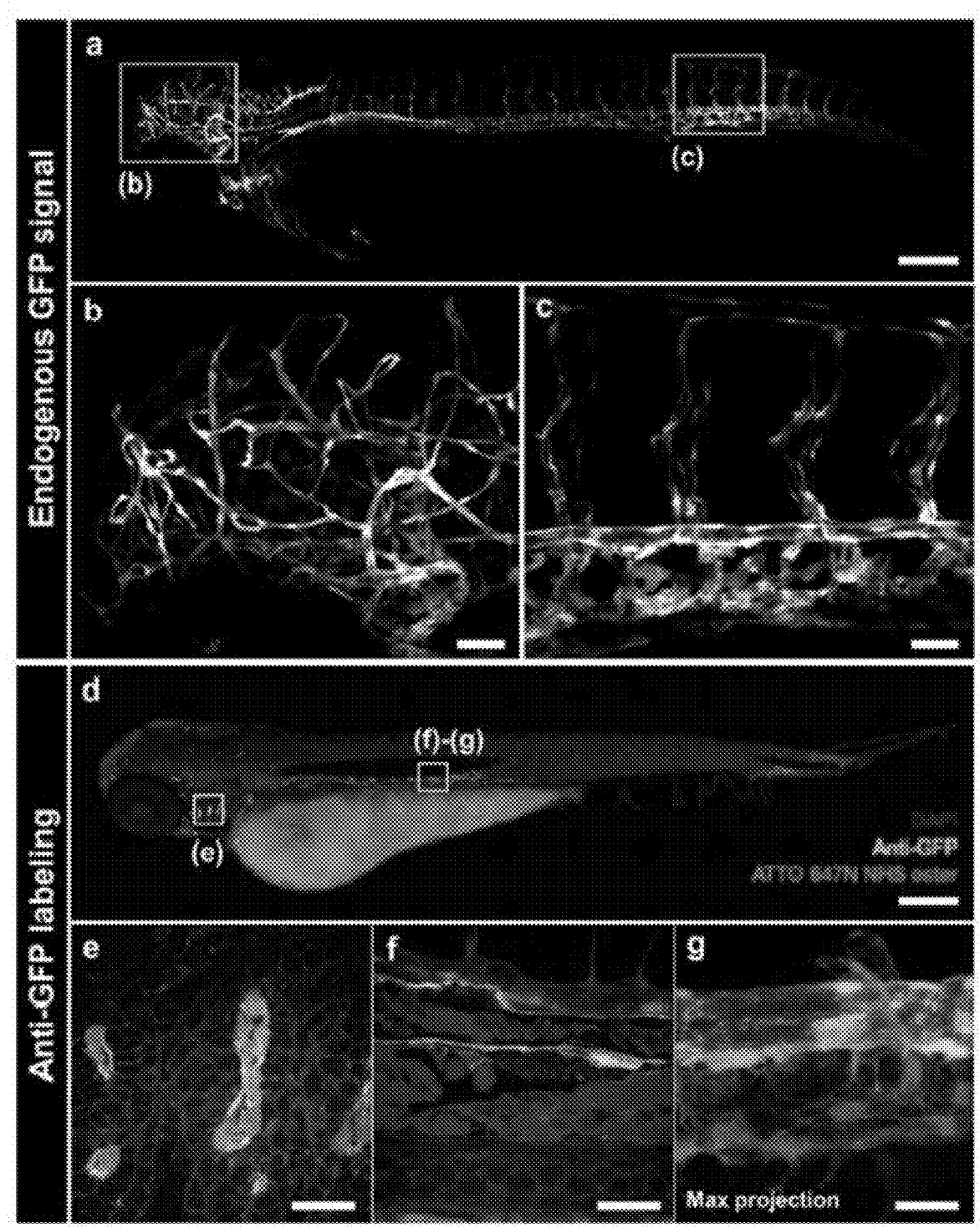

FIG. 6 is a view illustrating in detail a hydrogel-sample complex synthesis step (step 410 of FIG. 4) of an imaging method according to an embodiment. FIG. 7 is a view showing results of expansion of a vertebrate through decalfication treatment according to an embodiment. FIGS. 8, 9, and 10 are views showing results of imaging of an expanded vertebrate.

Referring to FIG. 6, a vertebrate, for example, juvenile zebrafish, is synthesized into a hydrogel-sample complex without undergoing a decalcification process. Afterwards, the hydrogel-sample complex is digested and then decalcified with a decalcifying solution containing 1M sodium chloride. In this instance, the sodium chloride serves to prevent the hydrogel-sample complex from expanding before calcium ions are completely removed through complete decalcification. Using this protocol, the whole body of the juvenile zebrafish was fully expanded up to 4.1 times the initial size, as shown in FIG. 7. Here, the eyes and head of the juvenile zebrafish were fully expanded, and its bones, cartilage, and muscles were expanded without distortion.

Specifically, in step 611, a sample of a vertebrate, for example, juvenile zebrafish, is fixed. For example, the sample is chemically fixed using 4% formaldehyde. Next, in step 613, biological molecules of the sample are labeled with a fluorescent material. A "precursor protein labeling" technique is applied to the juvenile zebrafish sample so that all proteins in the juvenile zebrafish sample are labeled with two types of fluorescent molecules (e.g., Atto 647N and Alexa 488). Next, in step 615, a hydrogel-related chemical material permeabilizes through the sample. For example, the sample is treated with an AcX solution containing a 0.1% Triton X-100 surfactant, and then treated for 18 hours with a hydrogel solution containing 0.05%-0.1% Triton X-100 and a VA-044 initiator. Next, in step 617, a hydrogel-sample complex is synthesized.

After the synthesis of the hydrogel-sample complex, the flow proceeds to step 420. Through this, the hydrogel-sample complex is digested using protein-degrading enzymes. For example, the hydrogel-sample complex is treated for 18 hours using protein-degrading enzymes, stained with NHS-ester molecules with a fluorescent tag, and then additionally treated with protein-degrading enzymes. After the digestion treatment, the hydrogel-sample complex is decalcified. In other words, in the present embodiments, decalcification treatment is performed on the hydrogel-sample complex after the digestion treatment. After the decalcification treatment, the hydrogel-sample complex is expanded by treatment with deionized water. Through this process, as shown in FIGS. 8, 9, and 10, overall structural characteristics of the inside of the juvenile zebrafish can be observed at 60 nm resolution.

(a) of FIG. 8 shows results of observation of juvenile zebrafish by a fluorescent microscope. (b) and (d) of FIG. 8 show different staining patterns of two types of fluorescent molecules. (e) of FIG. 8 shows a structure found in the eye of the juvenile zebrafish, in which AM means mesenchyme, ON means optic nerve, L means lens, CO means cornea, and RE means retina. (f) of FIG. 8 shows an enlarged view of a retinal area of the juvenile zebrafish, in which GCL means ganglion cell layer, IPL means inner plexiform layer, INL means inner nuclear layer, OPL means outer plexiform layer, ONL means outer nuclear layer, and PRL means photoreceptor layer. (g) of FIG. 8 shows a side view of the inner ear of the juvenile zebrafish where two different otoliths and three sensory patches are observed, in which UO means utricular otolith, SO means saccular otolith, and AC means anterior crista. (h) of FIG. 8 shows an otolithic membrane structure of the inner ear, and (i) of FIG. 8 shows an enlarged view of the sensory patches in the inner ear, in which HC means hair cell, SC means supporting cell, BM means basilar membrane, the arrows indicate kinocilium, and the arrowheads indicate stereocilia.

As can be seen from FIG. 8, lipid-rich parts are deeply stained with Atto 647N (pink), one of the two types of fluorescent molecules used in precursor protein staining, making it useful to observe a detailed structure of a cell organelle, and therefore it is useful to distinguish different types of cells or cell organelles. For example, a light receptor in the retina of the juvenile fish was homogeneously stained with Alexa 488 (green), whereas an outer segment having a complex membrane structure containing a large amount of cholesterol was deeply stained with Atto 647N. Also, the cornea, lens, retina, and optic nerve in the eye and the sensory patches and otoliths in the inner ear were distinctly labeled with Alexa 488. Among them, otolithic membrane structures or sensory hair cell bundles above the hair cells of a sensory area, that run toward the otoliths, could be observed in detail with Atto 647N.

(a) of FIG. 9 shows the positions of (b) through (o) of FIG. 9, and (b) through (d) of FIG. 9 show principal nervous sensory organs. Specifically, (b) of FIG. 9 shows the brain, in which the arrowhead indicates nuclei, the arrows indicate blood vessels, and the star indicates protoplasm. (c) of FIG. 9 shows olfactory epithelium, in which the black arrowhead indicates mitochondria, and the white arrowhead indicates microvilli. (d) of FIG. 9 shows a neuromast of a lateral line organ, in which HC means hair cell, SC means supporting cell, the arrow indicates intestinal villi, and the arrowhead indicates villi. (e) of FIG. 9 shows major organs in the digestive and urinary system, in which E means esophagus, L means liver, IB means intestinal bulb (stomach), P means pancreas, and PN means pronephros. (f) of FIG. 9 shows the pronephros and its internal motile villi (g) of FIG. 9. 9 shows long microvilli found near a connection between the esophagus and stomach, (h) of FIG. 9 shows goblet cells found in the mid-intestine, (i) through (o) of FIG. 9 show main structures of the musculoskeletal system. Specifically, (i) of FIG. 9 shows craniofacial cartilage, and (j) of FIG. 9 shows a cross-section observation of the body trunk, in which I means intestine, PN means pronephros, M means myomeres, NC means notochord, and SC means spinal cord. (k) of FIG. 9 shows an enlarged view of the notochord, and (l) of FIG. 9 shows a pectoral fin and cartilage cells observed inside it. (m) of FIG. 9 shows an enlarged view of skeletal muscle, (n) of FIG. 9 shows a cross-sectional view of smooth muscle, and (o) of FIG. 9 shows tendons found between bone and skeletal muscle.

Moreover, as can be seen from FIG. 10, it was possible to stain a specific protein inside the juvenile zebrafish with an antibody and observe the structure of the specific protein at super-high resolution by applying the present embodiments. (a) through (c) of FIG. 10 show results of observation of a GFP signal after a juvenile zebrafish expressing GFP inside expanded to four times the initial size, and (d) through (g) of FIG. 10 are results of observation after expansion by staining GFP with an antibody.

The whole process of the present embodiments which is called "Whole-ExM" is performed on 6-dpf juvenile fish for about 1 week. In the present embodiments, using a spinning disk confocal microscope instead of an existing point-scanning confocal microscope, super-high resolution images of expanded juvenile zebrafish in the whole organism stage were obtained at a rate several times faster. It takes about five minutes to obtain a single z-plane image of the expanded juvenile zebrafish at a resolution of around 62.5 nm, and it requires 5 days or so to obtain a three-dimensional image of the entire zebrafish sample. In the present embodiments, both wild-type juvenile zebrafish with a striped pattern and genetically modified zebrafish named Casper whose bodies had transparent skin were used, but it was found out that there were no significant differences between the two genetic lines.

Figure 11:
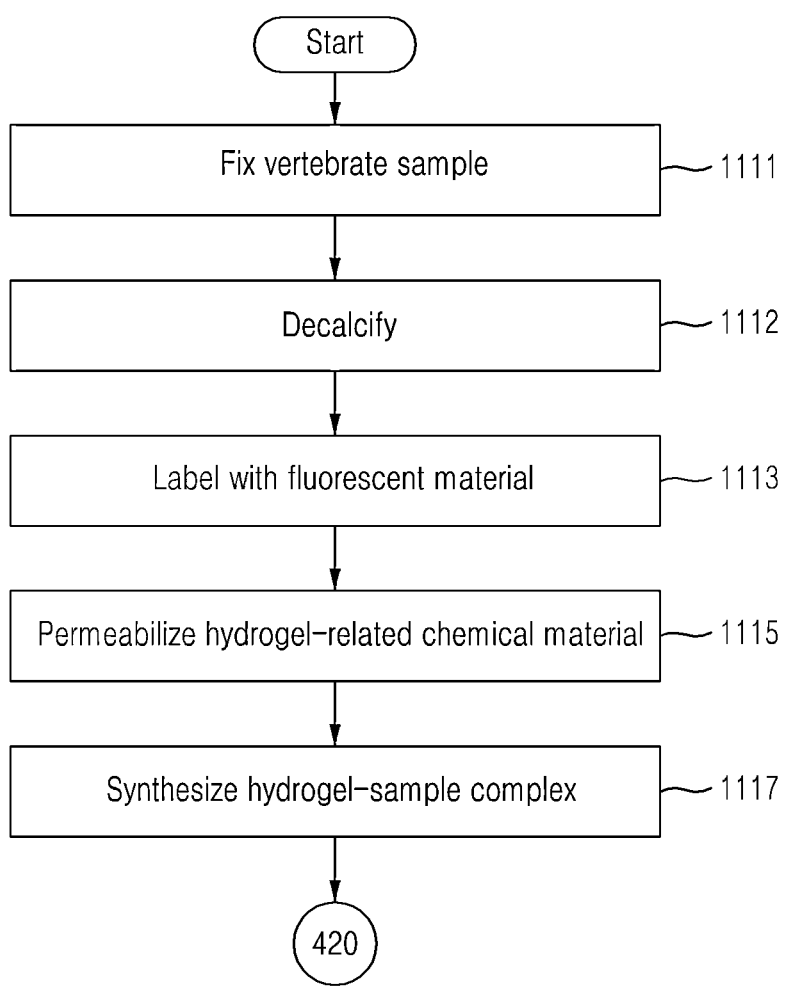
FIG. 11 is a view illustrating in detail a hydrogel-sample complex synthesis step of an imaging method according to another embodiment.
Figure 12:
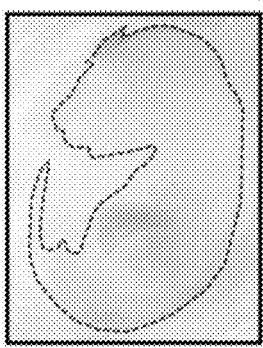
FIG. 12 is a view showing results of vertebrate expansion through decalcification treatment according to another embodiment.
Figure 12:
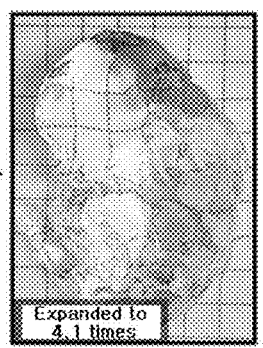
Figure 12:
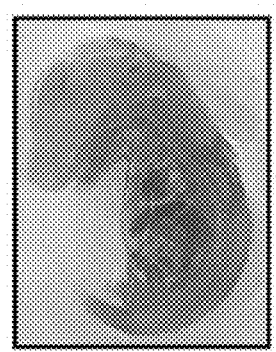
Figure 12:
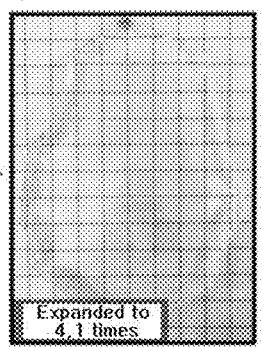

FIG. 11 is a view illustrating in detail a hydrogel-sample complex synthesis step (step 410 of FIG. 4) of an imaging method according to another embodiment. FIG. 12 is a view showing results of vertebrate expansion through decalcification treatment according to another embodiment.

Referring to FIG. 11, the technique of expanding the whole body of a vertebrate, which was verified in juvenile zebrafish according to the foregoing embodiment, is applied to a mouse embryo. The mouse embryo is several times bigger and thicker than the juvenile zebrafish, and its degree of decalcification of bones in it is higher, leading to the expectation that it is much more difficult to expand it with expansion microscopy. In this regard, in the present embodiments, a decalcification process is introduced into a vertebrate, for example, a mouse embryo, before the synthesis of a hydrogel-sample complex, to remove calcium in the bones, thereby synthesizing the hydrogel-sample complex. Afterwards, the hydrogel-sample complex is digested and decalcified. As a result, as can be seen from FIG. 12, the mouse embryo was uniformly expanded to four times or more the initial size.

Specifically, in step 1111, a vertebrate, for example, a mouse embryo sample, is fixed. Next, in step 1112, the sample is primarily decalcified. Next, in step 1113, biological molecules of the sample are labeled with a fluorescent material. Next, in step 1115, a hydrogel-related chemical material permeabilizes through the sample. Next, in step 1117, the hydrogel-sample complex is synthesized. In other words, in this embodiment, the sample is decalcified before the synthesis of the hydrogel-sample complex.

After the synthesis of the hydrogel-sample complex, the flow proceeds to step 420. Through this, the hydrogel-sample complex is digested using protein-degrading enzymes. After the digestion treatment, the hydrogel-sample complex is decalcified. In other words, in the present embodiments, decalcification treatment is performed on the hydrogel-sample complex. After the decalcification treatment, the hydrogel-sample complex is expanded by treatment with deionized water.

According to the present embodiments, the decalcification treatment using EDTA after the synthesis of the hydrogel-sample complex and the digestion through protein degradation play two key roles in uniformly expanding the vertebrate. The first role is to cause EDTA to better reach the calcium in the bones after the synthesis of the hydrogel-sample complex and the digestion through protein degradation. The second role is to cause calcium cations ($Ca^{2+}$) to bind to the polymer chains with negative charges to disturb the expansion of the polymer chains, in which case the EDTA helps expand hydrogel by removing the calcium cations ($Ca^{2+}$) from the polymer chains.

According to the present embodiments, a hydrogel-sample complex may be expanded more effectively by decalcifying an organism sample after the synthesis and digestion of the hydrogel-sample complex. That is, the organism sample may be uniformly expanded to four times or more the initial size. In this instance, the organism sample includes a vertebrate sample, and the vertebrate sample also may be uniformly expanded to four times or more the initial size. Accordingly, the entire organism sample may be imaged with a typical microscope. That is, super-high-resolution molecular imaging of the whole body of a vertebrate may be performed with a typical microscope.

The present embodiments may be applied in various applications. Firstly, the present embodiments enable accurate development of novel drugs and drug screening. It has become known recently that the gut-brain axis plays a significant role in the onset of cancer, brain diseases, immune diseases, etc. The gut-brain axis is the two-way biochemical signaling that takes place between the gut and the brain, which have been known to have no interactions because they are located far away from each other. Also, it became known that changes in the population of bacteria in the gut affect brain function and are closely associated with the onset and progression of various brain diseases such as autism spectrum disorders, Parkinson's disease, Alzheimer's disease, etc. Moreover, it was found that the gut-brain axis is closely associated with cancer and immune diseases, as well as brain diseases. These research findings suggest that it is hard to precisely understand the causes of such diseases and furthermore to verify the efficacy of newly developed drugs and study their side effects, simply by studying the brain or the gut in particular. In the present embodiments, the whole body of a vertebrate is uniformly expanded, making it possible to observe molecular changes occurring in the whole body of the vertebrate within a short time. Through this, molecular changes occurring in the whole body of a juvenile zebrafish, a mouse embryo, or an adult mouse may be observed simultaneously at super-high resolution, thereby enabling verifications of the efficacy of novel drugs and studies of their side effects with several times higher accuracy than existing methods. Secondly, the present embodiments are applicable to the study of embryology. The staining method proposed in the present embodiments is applicable to each individual vertebrate as well as a thin tissue section. Since the whole body of an individual vertebrate with no damage to it may be three-dimensionally stained and observed at super-high resolution, this method is highly useful in observing changes in tissues and organs into which cells differentiate, occurring through the stages of development of an individual, and differences in the shape and density of cell organelles.

Accordingly, the present embodiments do not require expensive chemical specimens in the first place and allow for observing nearly all structures within a biological sample at super-high resolution through a simple process. High resolutions obtained by expansion are expected to allow pharma companies developing cures for cancer, brain diseases, and immune diseases to observe how organelles in cell tissue change form through the stages of onset or treatment of diseases, and this may contribute to the making of the companies' profits. For example, the use of zebrafish in the development of novel drugs by global pharmaceutical companies is increasing rapidly because they have the same organs as humans, can be bred in large numbers at low costs in a relatively narrow space, are easy to genetically modify, and can be used for animal behavior experiments. In fact, one of the global pharmaceutical companies is known to have been actively using zebrafish in the study of the brain and the development of drugs for brain diseases. It is expected that the present embodiments enable observing, with super-high resolution, molecular changes occurring inside entire zebrafish and vertebrates, allowing global pharmaceutical companies to utilize these embodiments in the development and screening of drugs using zebrafish.

Meanwhile, with the astronomical amount of money recently invested in the development of novel drugs, there is a need to discover new biomarkers that have not been known traditionally or to accurately observe side effects of drug treatments or changes occurring in the whole body. Using the present embodiments, it is possible to observe structural changes in zebrafish or mouse embryos or changes in molecular expression with an accuracy four times as high as or higher than in existing methods. Accordingly, based on the present embodiments, it is expected that several thousands of species in zebrafish lines present all over the world can be imaged, and differences in structure or molecular expression observed for each line can be integrated into a database. Such a database may contain highly-value added information that can be used to discover new biomarkers in the future. Moreover, another expectation is that services will be provided that observe changes occurring in zebrafish or mouse treated with drugs.

According to the present embodiments, the imaging method includes: the step 410 of synthesizing a hydrogel-sample complex from an organism sample; the step 420 of digesting the hydrogel-sample complex; the step 430 of decalcifying the hydrogel-sample complex; the step 440 of expanding the hydrogel-sample complex; and the step 450 of imaging the expanded organism sample using the hydrogel-sample complex.

According to the present embodiments, the organism sample includes a vertebrate sample.

According to the present embodiments, the decalcifying step 430 includes removing calcium in the bones of the vertebrate sample using a decalcifying solution.

According to the present embodiments, the decalcifying solution includes EDTA (ethylenediaminethetraacetic acid).

According to the present embodiments, the decalcifying solution contains sodium chloride so as to prevent the hydrogel-sample complex from expanding before the calcium in the bones of the vertebrate sample is removed.

According to the present embodiments, the step 410 of synthesizing a hydrogel-sample complex includes the step 617 and 1117 of synthesizing a hydrogel-sample complex after the step 613 and 1113 of labeling at least one biological molecular of the organism sample with at least one fluorescent material.

According to the present embodiments, the imaging method further includes the step 1112 of decalcifying the organism sample before the step 1117 of synthesizing a hydrogel-sample complex.

According to the present embodiments, the digestion step 420 includes the step of performing digestion using protein-degrading enzymes.

According to the present embodiments, the expanded organism sample expands uniformly to four times or more the initial size.

The present embodiments provide an imaging apparatus for observing biological structure information of an expanded whole organism at super-high resolution.

Second embodiments of the present disclosure provide a method of optimizing chemical staining and expansion imaging.

N-Hydroxysuccinimide esters (hereinafter, NHS-esters), which were conventionally developed to conjugate an antibody and a fluorescent material, and NHS-esters conjugated with fluorescent materials are frequently used to conjugate an antibody and a fluorescent material because they specifically bind to an amine protein of the antibody. Along with this, there was developed a technique in which protein structures of a biological sample are chemically labeled with a very high density and observed at high resolution using expansion, by labeling a primary amine protein, one of the major protein components of the biological sample, using an NHS-ester conjugated with a fluorescent material alone, without the use of an antibody. However, the existing studies of protein structures of a biological sample using an NHS-ester conjugated with a fluorescent material showed most of the protein structures of the biological sample using the NHS-ester conjugated with the fluorescent material, but did not show all of the protein structures. Also, there is research showing that different protein structures were observed depending on the type of fluorescent material bound to the NHS-ester, with findings indicating that an NHS-ester conjugated with a specific fluorescent material allows for closer observation of a specific protein.

From this, it was discovered that the hydrophilicity and hydrophobicity of the fluorescent material conjugated to the NHS ester greatly affect the conjugation of the NHS-ester and the biological sample to the primary amine protein, taking notice that different proteins are observed depending on the type of fluorescent material bound to the NHS-ester. In this regard, the present embodiments propose a technique in which, using the hydrophilic and hydrophobic nature, all proteins in a specimen of a biological sample are fluorescently stained using an NHS-ester conjugated with a hydrophilic fluorescent material and an NHS-ester conjugated with a hydrophobic fluorescent material, thereby overcoming the drawback of the existing techniques incapable of labeling all primary amin proteins of a biological sample. By combining the existing chemical labeling method with expansion microscopy, a protein labeling process using an antibody was replaced by a high-density chemical labeling method to make observations in a mouse's kidney tissues or cells. However, the present embodiments go further than the existing techniques and apply very high-density chemical labeling and expansion microscopy to most of the major organs of mice, vertebrate such as juvenile zebrafish, and mouse embryos and optimize them.

Expansion microscopy basically consists of the following processes: permeabilization through a biological sample; fluorescent labeling, i.e., staining, using a protein antibody; anchoring to link an antibody and a hydrogel; gelation to cause the hydrogel to expand; digestion for uniform expansion; and expansion. In the present embodiments, the optimization of fluorescent staining was attempted by performing fluorescent staining before, after, and during the digestion, which is a process in expansion microscopy, in order to optimize the application of very high-density chemical labeling and expansion microscopy to most of the major organs of mice, vertebrate such as juvenile zebrafish, and mouse embryos. Also, the present embodiments discovered that more structures were observed by performing staining during the digestion, rather than before or after the digestion. Through this optimization, it is more likely to bring about a better understanding of the functions of proteins, the causes of diseases, and protein structural changes caused by disease, based upon an understanding of major three-dimensional protein structures of vertebrates.

FIG. 13, FIG. 14, FIG. 15, and FIG. 16 are resulting images for explaining a process for deriving a method of optimizing chemical staining and expansion imaging according to second embodiments of the present disclosure.

It was assumed that a structure stained on a primary amine protein of a biological sample using an NHS-ester conjugated with a fluorescent material relied on the hydrophilic and hydrophobic nature of the fluorescent material. To confirm this assumption, fluorescent staining was performed on brain tissue of a mouse that has undergone permeabilization by using an NHS-ester conjugated with a fluorescent material, and then gelation, digestion, and expansion were sequentially performed.

Figure 13:
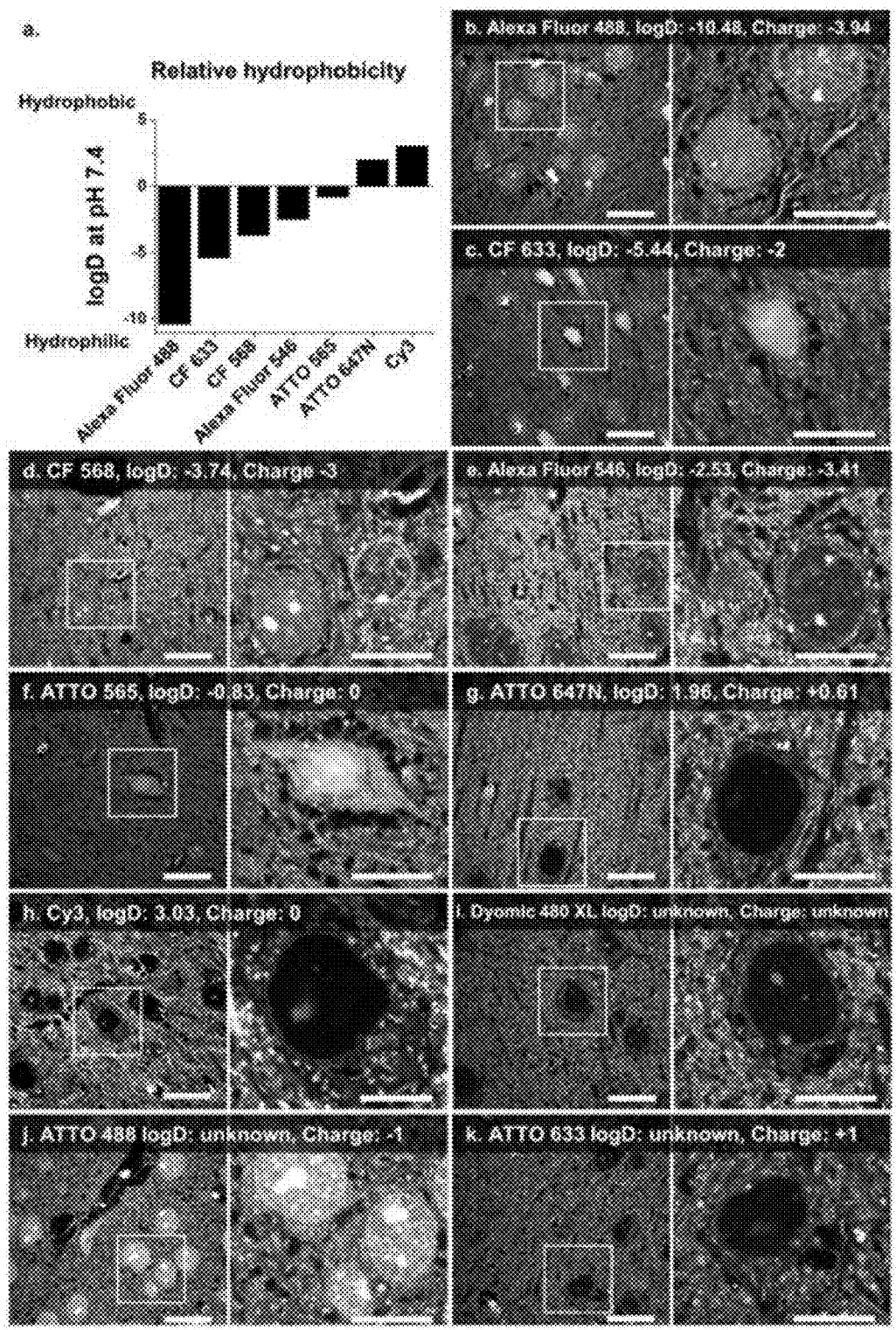
FIG. 13, FIG. 14, FIG. 15, and FIG. 16 are resulting images for explaining a process for deriving a method of optimizing chemical staining and expansion imaging according to second embodiments of the present disclosure.

As a result, as illustrated in FIG. 13, it was found that the fluorescently stained images of the brain tissue of the mouse are different depending on the properties of different fluorescent materials. Specifically, FIG. 13 shows comparison results obtained by observing, with a fluorescent microscope, expanded brain sections of the mouse stained with NHS-esters conjugated with 10 types of fluorescent materials. In FIG. 13, (a) shows a comparison of the relative hydrophobicity of six types of fluorescent materials including Alexa Fluor 488, and (b) through (k) show the expanded brain sections of the mouse stained with NHS-esters conjugated with Alexa Fluor 488, CFF 633, CF 568, Alexa Fluor 546, ATTO 565, ATTO 647, Cy3, Dyomic 480 Xl, ATTO 488, and ATTO 633 and information on the hydrophobicity and charges of the fluorescent materials. In (b) through (k) of FIG. 13, the scale bars in the right images are 20 μm, the scale bars in the enlarged images on the right are 5 μm, and the lengths of all the scale bars were measured before expansion. From these results, it was verified again that the cytoplasm of the brain tissue was rendered differently when NHS-Alexa Fluor 488 conjugated to a relatively hydrophilic fluorescent material, NHS-ATTO647N conjugated to a relatively hydrophobic fluorescent material, and NHS-Cy3 conjugated to the most hydrophobic fluorescent material.

Figure 14:
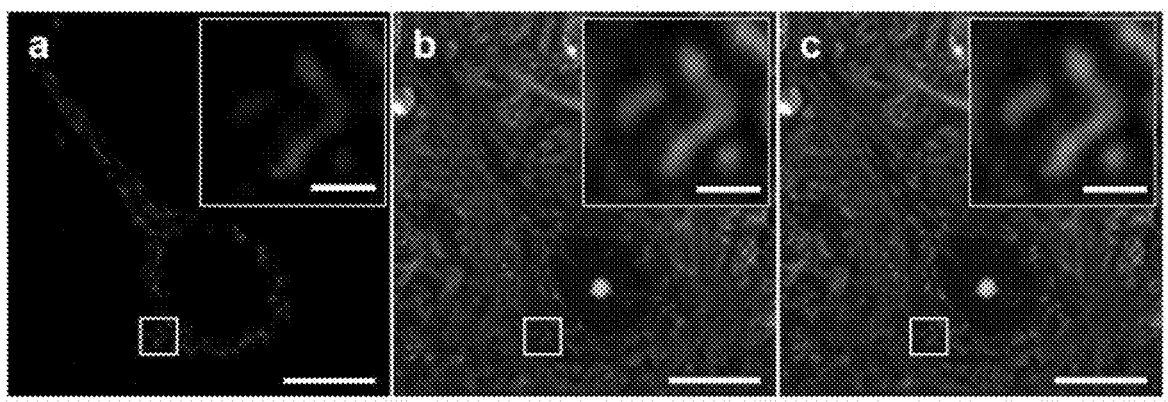

In this instance, the hydrophobic fluorescent materials were stained at a resolution high enough to clearly show a three-dimensional linear structure that was presumed to be the mitochondria, endoplasmic reticulum, and Golgi apparatus in the cytoplasm. As illustrated in FIG. 14, a mouse line with transformed mitochondria was used to identify whether a mitochondria-like structure stained with an NHS-ATTO647N conjugated to a hydrophobic fluorescent material is mitochondria or not, whereby the mitochondria were labeled with the NHS-ATTO647N conjugated to the hydrophobic fluorescent material. In FIG. 14, the scale bar in each image is 10 μm, and the scale bar in the enlarged image within each image is 5 μm. From this, it was concluded that the hydrophobic fluorescent material induced more conjugations in lipid structures within the cytoplasm, increasing the resolution of the lipid structures. However, while the lipid structures exhibited high resolutions, the other structures exhibited low resolutions. On the other hand, the hydrophilic fluorescent material did not induce more conjugations in the lipid structures but exhibited uniform staining of all amine proteins, which indicate that, although the lipid structures within the cytoplasm and the cytoplasm are hardly distinguishable from one another, all the other structures are identifiable.

Figure 15:
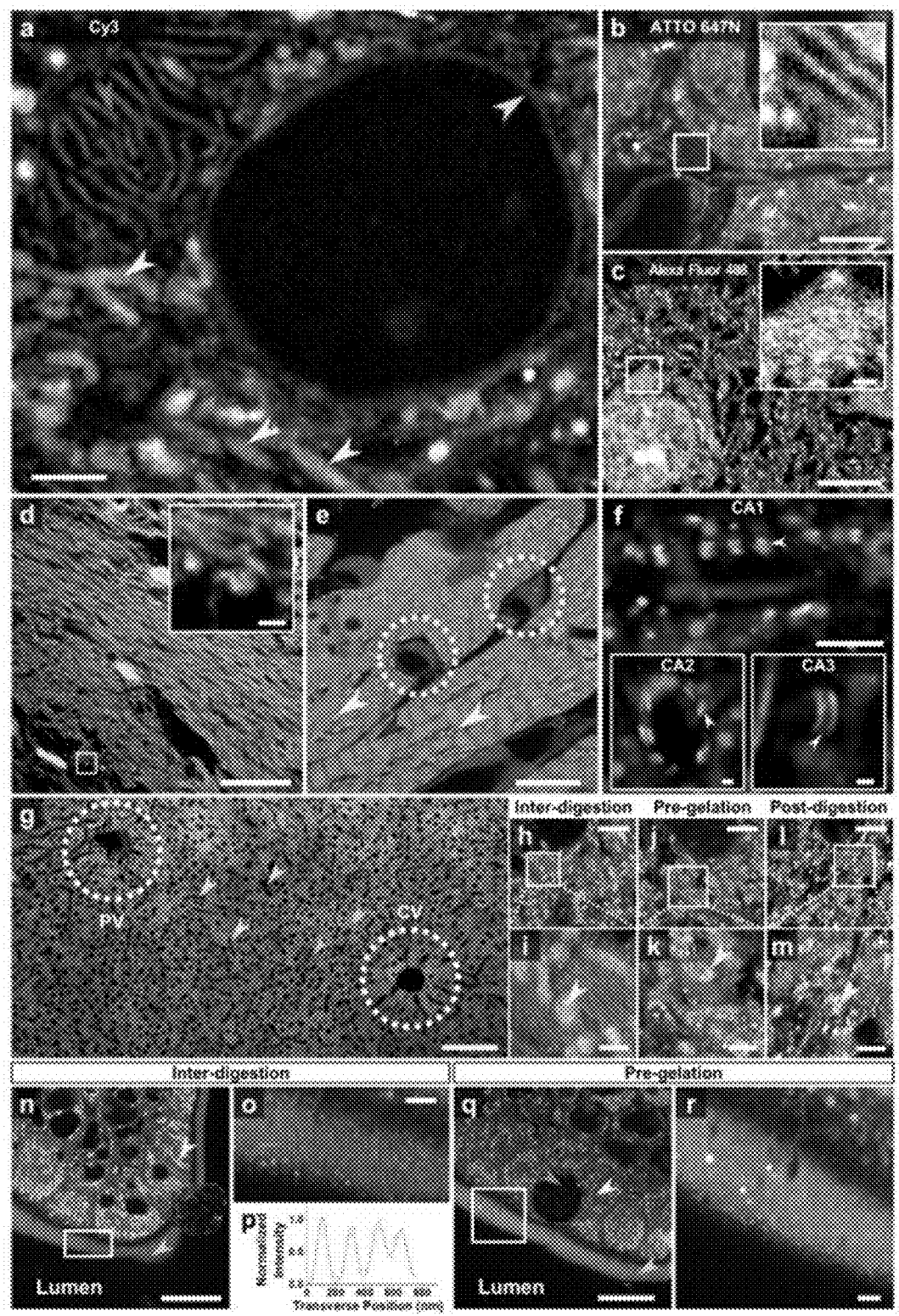

From these results, the present embodiments propose a technique in which all protein structures including lipid structures in the cytoplasm can be observed by fluorescently staining an NHS-ester (hereinafter, hydrophilic NHS-ester) conjugated with a hydrophilic fluorescent material and an NHS-ester (hereinafter, hydrophobic NHS-ester) conjugated with a hydrophobic fluorescent material. In this instance, as illustrated in FIG. 15, the myelinated neuron fibers in the corpus callosum in the brain of the mouse, the hydrophilic NHS-ester stains the whole fibrous tissue, and the hydrophobic NHS-ester deeply stains the myelin protein having lipid characteristics. Moreover, in the case of the heart tissue of the mouse, the hydrophilic fluorescent material stains general structures such as the cytoplasm and the capillaries, except Z-lines, A-bands, and M-lines in muscle fiber cells, whereas the hydrophibic fluorescent material deeply stains Z-lines, A-bands, M-lines, muscle membranes, capillaries, and mitochondrial structures.

Specifically, (a) through (c) of FIG. 15 show resulting images obtained by observing an expanded brain section of a mouse, stained with an NHS-ester conjugated with a fluorescent material, by a fluorescent microscope, in which the red arrow indicates the Golgi-apparatus. In this case, (a) (scale bar: 10 μm) of FIG. 15 was stained with Cy3 NHS-ester, (b) (scale bar: 5 μm/insert image scale bar 500 nm) of FIG. 15 was stained with Alexa Fluor 488 NHS-ester, and (c) (scale bar: 5 μm/inset image scale bar 500 nm) of FIG. 15 was stained with ATTO 647N NHS-ester. (d) (scale bar: 20 μm/inset image scale bar 500 nm) of FIG. 15 shows a resulting image obtained by observing an expanded corpus callosum of the brain of the mouse, in which green indicates staining with Alexa fluor 488 NHS-ester, and pink indicates staining with ATTO 647N NHS-ester. (e) (scale bar: 10 μm) of FIG. 15 shows a resulting image obtained by observing an expanded heart section of the mouse, by a fluorescent microscope, in which green indicates staining with Alexa fluor 488 NHS-ester, and pink indicates staining with ATTO 647N NHS-ester. In this case, the blue arrow indicates myocardial cells, the yellow circles indicate capillaries, and the yellow arrows indicate mitochondria. (f) (scale bar: 5 μm/inset image scale bar 1 μm) of FIG. 15 shows a resulting image obtained by observing CA1, CA2, and CA3 regions of an expanded hippocampus of the mouse, in which green indicates Homer1, sky blue indicates Bassoon, and pink indicates staining with Cy3 NHS-ester. (g) through (m) of FIG. 15 show resulting images obtained by observing an expanded liver section of the mouse by a fluorescent microscope, in which black and white indicates staining with ATTO 647N NHS-ester, and blue indicates staining with DAPI. Here, all the lengths were measured before expansion.

All of the results were obtained by performing fluorescent staining after a permeabilization process using 0.2% Triton X-100 which generally involves the use of antigen-antibody, and this method may be replaced with a staining technique generally used for antigen-antibody. However, since NHS-esters bind to amine proteins in antibodies, it was necessary to check whether labeling using an antibody and fluorescent labeling using an NHs-ester can replace each other. In this regard, an NHS-ester conjugated with two types of synaptic markers, which are very small protein structures in a brain section, and a hydrophobic fluorescent material were used for checking. When a brain section was stained with an NHS-ester conjugated with Homer1, which is a postsynaptic marker, and Bassoon, which is a presynaptic marker, Cy3 did not overlap with fluorescent signals of Homer1 and Bassoon, and took the shape of a band between them. This band was closer to and overlapped with Bassoon, which is presumed to be the result of staining of synaptic vesicles densely present in synaptic vesicles. That is, it is assumed that this is because the number of primary amines present in brain tissue is much greater than that of primary amines present in antibodies. Accordingly, it was confirmed that labeling using an antibody and fluorescent labeling using an NHS-ester can replace each other.

Figure 16:
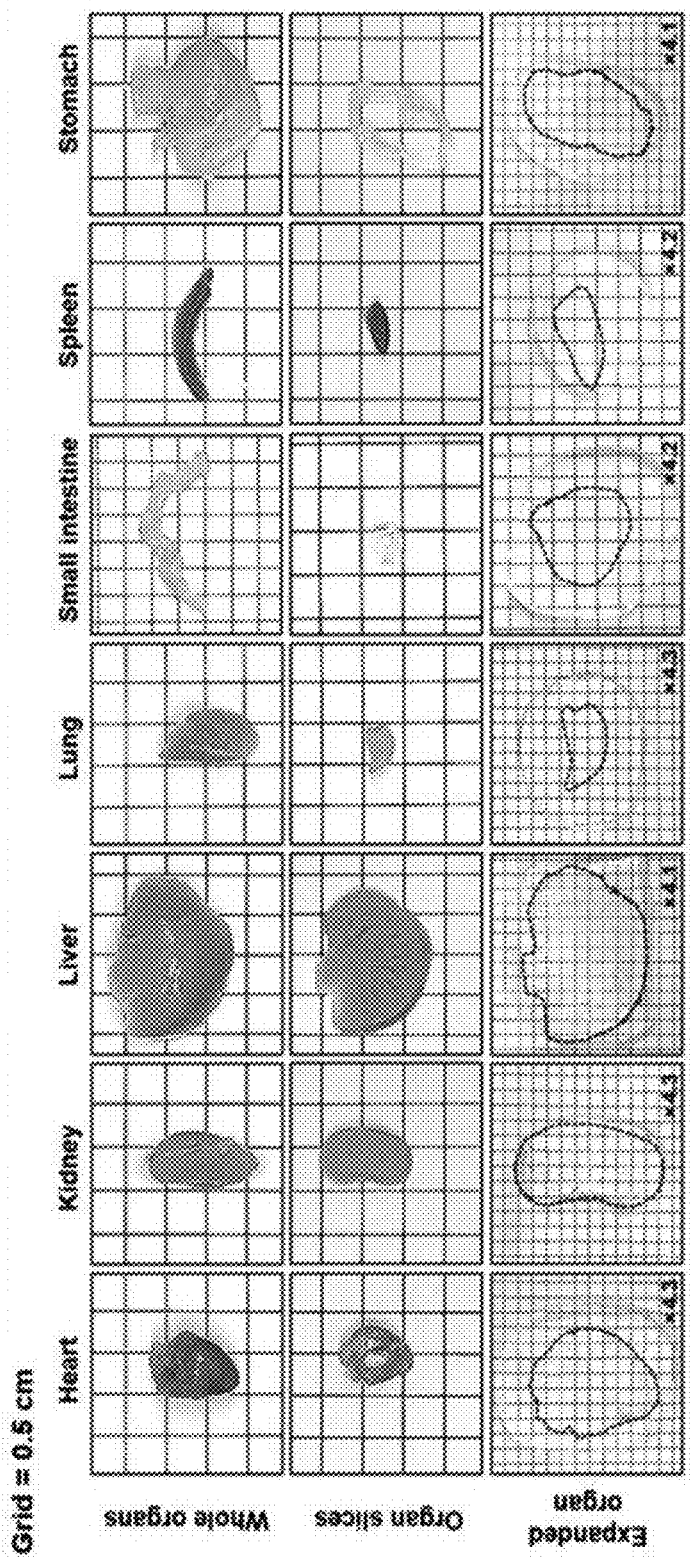

In order to overcome the limitations of existing super-high resolution fluorescent staining techniques using an NHS-ester which are applicable only to kidney tissues or cells of a mouse, it was necessary to optimize expansion microscopy to make it applicable to sections of the brain tissue and most of the organs of the mouse. Conventionally, digestion using a collagen-degrading enzyme (collagenase 4) and a protein-degrading enzyme (proteinase K) was applied to expansion microscopy to expand the kidney. However, not all the organs were not expanded using the same digestion method as used to expand the kidney. This is because each organ has different types and distributions of collagen, and a different digestion technique needs to be optimized for each organ. However, it was anticipated that the development of a technique for digesting each organ using the same method could allow for the development of a technique using the whole body of a vertebrate without slicing it. As illustrated in FIG. 16, it was discovered that 1-mm thick sections of the heart, kidney, liver, lung, spleen, and stomach expanded to four times or more the initial size through repeated digestion using a protein-degrading enzyme (proteinase K) at 37° C.

Lastly, considerations were given to the environment where the brightness of fluorescent materials could be lowered, in order to optimize fluorescent staining using an NHS-ester conjugated with a fluorescent material to maximize the resolution of final images. The first consideration is that the resolution of images may be decreased when the brightness of fluorescent materials is lowered due to excessive digestion. The second consideration is that an ammonium persulfate (APS) initiator used in the gelation of hydrogels which can expand in an expansion microscopy process can cause photo-bleaching of fluorescent materials, lowering the brightness of the fluorescent materials and decreasing the resolution of images. To verify this, the following methods of staining with NHS-esters conjugated with fluorescent materials were compared: (1) a method of fluorescent staining before digestion (pre-gelation) in which hydrogel synthesis is performed after a specimen is fluorescently stained with an NHS-ester; (2) a method of fluorescent staining during digestion (inter-digestion) in which simple digestion using degrading enzymes is performed after synthesizing a hydrogel within a specimen and then additional digestion is performed after fluorescent staining with an NHS-ester conjugated with a fluorescent material; and (3) a method of fluorescent staining after digestion (post-digestion) in which repeated digestion is performed after synthesizing a hydrogel within a specimen and then fluorescent staining is performed using an NHS-ester conjugated with a fluorescent material.

Among these three staining methods, the method of fluorescent staining during digestion distinctively showed the most various structures. For example, as illustrated in FIG. 15, there were remarkable differences in the resolution of anatomical structures among the method of fluorescent staining before digestion, the method of fluorescent staining during digestion, and the method of fluorescent staining after digestion. (g) (scale bar: 100 μm) of FIG. 15 shows histological characteristics of a normal mouse liver, observed through staining with ATTO 647N NHS-ester during digestion, in which PV represents portal vein, and CV represents central vein. The white arrows indicate sinusoids, and the green arrows indicate liver cells. Meanwhile, (h) and (i) of FIG. 15 show resulting images obtained by applying staining during digestion, (j) and (k) of FIG. 15 show resulting images obtained by applying staining before digestion, and (l) and (m) of FIG. 15 show resulting images obtained by applying staining after digestion. Here, (i), (k), and (M) (scale bar: 1 μm) of FIG. 15 are enlarged images of (h), (j), and (l) (scale bar: 5 μm) of FIG. 15. The red arrows indicate the Golgi apparatus, and the yellow arrows indicate mitochondria. (n) through (r) (scale bar: (n) 10 μm; (o) 1 μm; (q) 10 μm; and (r) 1μ) show resulting images obtained by observing an expanded section of the small intestine of the mouse, in which black and white indicates staining with Atto 647N NHS-ester, and blue indicates staining with DAPI. The pink arrows indicate a goblet cell, the green arrows indicate mitochondria, and the sky blue arrow indicates a brush border. Here, all the lengths were measured before expansion. Notably, the method of fluorescent staining after digestion exhibited a resolution at which an anatomical structure of a mouse liver was hard to observe, and the method of fluorescent staining before digestion exhibited a resolution at which the structure of the Golgi apparatus between mitochondria of the mouse liver was hard to observe, whereas the method of fluorescent staining during digestion exhibited a resolution at which the Golgi apparatus between mitochondria was clearly observed. Additionally, these methods showed distinct differences in the resolution of the brush border of the small intestine of the mouse.

Additionally, the brightness of fluorescent signal in the method of fluorescent staining during digestion was higher than that in the method of fluorescent staining before digestion. It is assumed that the lower brightness in the method of fluorescent staining before digestion was due to the bleaching of fluorescent tags by free radicals produced during gelation. Furthermore, the method of fluorescent staining during digestion helps expose primary amines trapped in proteins through digestion and stain them with the fluorescent tags bound to an NHS-ester, thereby enabling imaging with higher brightness.

Figure 17:
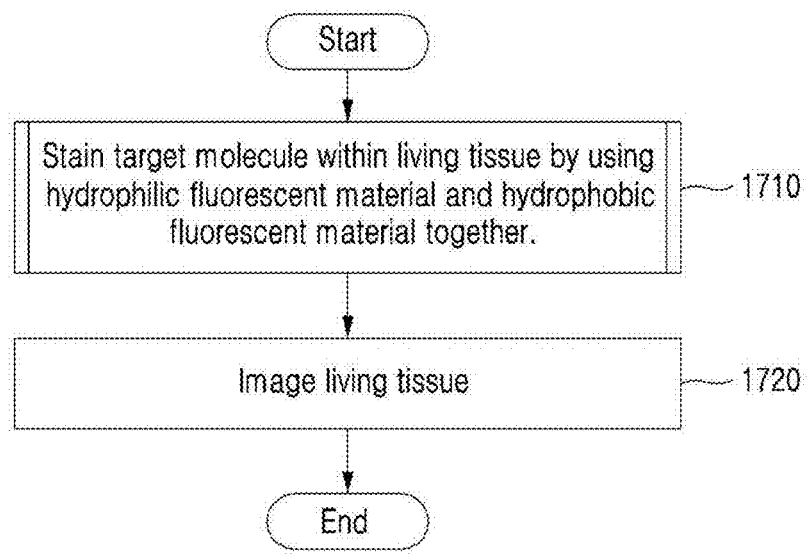
FIG. 17 is a view illustrating a method of optimizing chemical staining and expansion imaging according to the second embodiments of the present disclosure.

FIG. 17 is a view illustrating a method of optimizing chemical staining and expansion imaging according to the second embodiments of the present disclosure.

Referring to FIG. 17, in step 1710, a target molecule within a living tissue is stained by using a hydrophilic fluorescent material and a hydrophobic fluorescent material together. Specifically, the target molecule is stained by using an NHS-ester conjugated with a hydrophilic fluorescent material and an NHS-ester conjugated with a hydrophobic fluorescent material together. For example, the target molecule is stained with an NHS-ester conjugated with the hydrophilic fluorescent material and an NHS-ester conjugated with the hydrophobic fluorescent material. This will be described in more detail with reference to FIG. 18.

Figure 18:
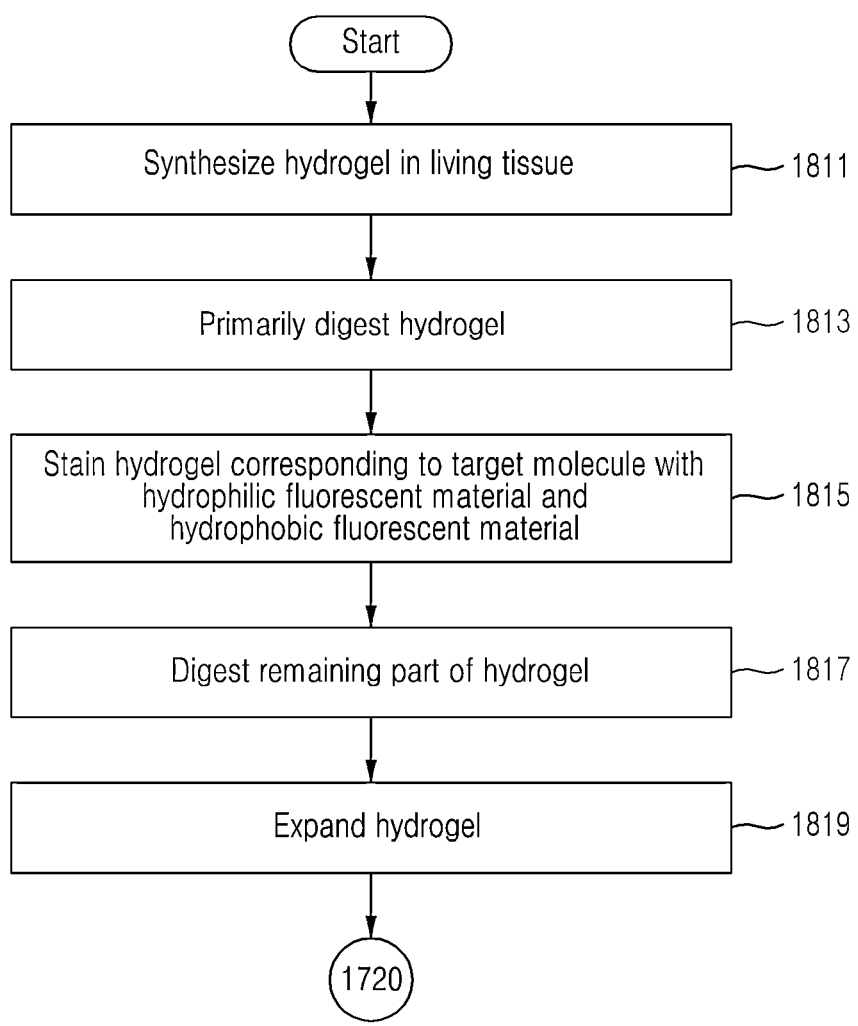
FIG. 18 is a view illustrating in detail the step of staining a target molecule in FIG. 17.

FIG. 18 is a view illustrating in detail the step 1710 of staining a target molecule in FIG. 17.

Referring to FIG. 18, in step 1811, a hydrogel is synthesized in biological sample. Next, in steps 1813, 1815, and 1817, the hydrogel is stained with a hydrophilic fluorescent material and a hydrophobic fluorescent material during digestion of the hydrogel so as to correspond to the target molecule. In this instance, the digestion is performed using protein-degrading enzymes. Specifically, in step 1813, the hydrogel is primarily digested. Next, in step 1815, the hydrogel is stained with the hydrophilic fluorescent material and the hydrophobic fluorescent material so as to correspond to the target molecule. Afterwards, in step 1817, the remaining part of the hydrogel is digested. Next, in step 1819, the hydrogel is expanded. Afterwards, the flow returns to FIG. 17 and proceeds to step 1720.

According to the present embodiments, the hydrophilic fluorescent material stains the entire structure of the target molecule, the hydrophobic fluorescent material stains part of the structure of the target molecule. In this case, the NHS-ester conjugated with the hydrophobic fluorescent material helps stain part of the structure of the target molecule with the hydrophobic fluorescent material as that part of the structure is exposed from inside the target molecule through digestion.

Referring back to FIG. 17, in step 1720, the biological sample is imaged. In this case, the expanded biological sample is imaged as the expanded hydrogel is imaged. Accordingly, a final image of the target molecule is obtained.

According to the present embodiments, an image processing apparatus for imaging a biological sample according to the above-described method is provided.

In the second embodiments of the present disclosure, chemical staining and expansion imaging are optimized by staining a target molecule within a biological sample using a hydrophilic fluorescent material and a hydrophobic fluorescent material together. In other words, the present disclosure allows for observing all protein structures in a biological sample by chemically labeling the protein structures of the biological sample with a very high density and imaging them at a high resolution through expansion.

The present embodiments may be adopted and applied in various fields.

Firstly, the present embodiments may be adopted and applied to diagnostic kits. With the growth of the healthcare industry, it is becoming necessary to identify structural characteristics of various diseases and make an accurate diagnosis of diseases. Under this circumstance, the traditional H&E staining method is widely used in the diagnosis of diseases. However, studies showed that high-resolution microscopic techniques were used to achieve diagnostic accuracy because of high misdiagnosis rates of H&E staining due to resolution limits. However, the high-resolution microscopic techniques take too much time to prepare specimens and are difficult to do so, so they are rarely used in actual diagnoses in hospitals and clinics. Using the technology according to the present embodiments, it is expected that super-high resolution fluorescent microscopy can provide easy and quick diagnosis to enable high-resolution observations of small protein structures, thereby lowering the misdiagnosis rates of diseases. Moreover, kits may be developed to apply the technology according to the present embodiments so that hospitals, clinics, or tissue testing agencies can make effective use of them.

Secondly, the present embodiments may be adopted and applied in embryological research. Animals used in embryology are experimental animals that biologically age fast and are genetically similar to humans. African clawed frogs, juvenile zebrafish, and mouse embryos are the animals most frequently used in embryology. These three types of experimental animals have quite different characteristics, and different experimental methods and different experimental specimens are used for each experimental animal. For example, an antibody that works on mouse embryos cannot be used for African clawed frogs and juvenile zebrafish, or an antibody that works on juvenile zebrafish does not work on African clawed frogs and mouse embryos. However, the staining methods proposed in the present embodiments is equally available for these three types of experimental animals and allow for research into high-resolution, three-dimensional protein structures, making it highly useful in observing changes in tissues and organs into which cells differentiate, occurring through the stages of development of an individual, and differences in the shape and density of cell organelles.

The technology according to the present embodiments allows for quicker and deeper fluorescent staining than existing methods of research using antigen-antibody because they are cost-effective and the labels are very small in size. Moreover, the technology according to the present embodiments is expected to replace H&E staining which have high misdiagnosis rates due to the low resolutions used for disease diagnosis. Furthermore, the technology according to the present embodiments may allow the development of simple kits that can be used in pharmaceutical companies or the like to observe changes in organelles in cell tissues that occur through the steps of progression or treatment of diseases, thus contributing to the making of the companies' profits.

The technology according to the present embodiments offers high versatility that allows for research into three-dimensional protein structures, which are hard to observe in embryology, and also provides high-resolution observations of changes in pathological structures of biological specimens for diagnosis in hospitals and clinics, and therefore will have various uses for research in the fields of medicine, pharmacy, neuroscience, and embryology.

With advances in medical technology and state-of-the-art imaging technology, there is a growing demand for customization of disease diagnosis for each individual having different needs. To provide a customized disease diagnosis for each individual, it is necessary to make a detailed observation of developmental structures in a disease model. Also, in the field of artificial organs, there is a need to precisely analyze similarities between real organs and artificial organs and how a disease causes deformities in organ structures. Using the technology according to the present embodiments, it is possible to easily observe protein structures with a resolution of about 60 nanometers with a typical optical microscope by applying the same method to a wide range of biological specimen. These characteristics of the technology according to the present embodiments may be used for a variety of industrial and research applications.

Third embodiments of the present disclosure provide 3D image registration via dense staining and a super-resolution multiplexed imaging method using the same.

The present embodiments propose a novel technology for dramatically improving the accuracy of image registration by placing a fiducial marker as a structure within a tissue via dense staining, rather than within the nucleus of a cell, in a process of image registration which takes place during multiplexing. In other words, the present embodiments propose a technology that provides an image registration accuracy of around 10 nm by placing fiducial markers for more packed image registration via dense staining in which signal deformation does not occur during repeated antibody and DNA probe labeling. Moreover, the present embodiments can replace all of the existing multiplexed imaging techniques, repeated antibody staining techniques, expansion microscopy techniques, and sequential fluorescence in situ hybridization (Sequential FISH) of nucleic acids. Connectomics research and the development of immunotherapy cancer drugs require multiplexed imaging, for which a multiplexed imaging technique using image registration is necessary. The present embodiments allow for super-resolution multiplexed imaging with enhanced accuracy, thus providing enormous technological potential. The necessity of the multiplexed imaging technique is increasing in the following variety of fields.

With the acceleration of the development of immunotherapy cancer drugs which are drawing attention as next-generation anticancer drugs, that have a lower chance of relapse and less side effects compared to existing anticancer drugs which are low in efficiency and efficacy due to tolerability, the demand for multiplexed imaging is steadily growing. Notably, it is frequently reported that there were significant differences in the effectiveness of anticancer treatment among patients even though they all had the same type of cancer, and even the same cancer tissue showed variations in genetic mutations and therefore express different proteins. In this regard, multiplexed imaging techniques have been recently developed that simultaneously observe numerous biomarkers within a cancer tissue in order to develop the best immunotherapy cancer drugs. However, these techniques lack versatility because of their drawbacks such as requiring costly special equipment or bringing damage to the specimen during imaging.

DNA sequencing technology has been highly developed to analyze genes by separating all cells from their original positions and interpreting DNA sequences. In order to do a genetic analysis for diseases such as cancer, it is necessary to develop a technique that performs a genetic interpretation in a biological context while maintaining the positions of cells, rather than separating the cells as in the existing DNA sequencing techniques. As such a technique, spatial transcriptomics, in which a spatial analysis of genes is performed in a biological context, was selected as Nature's Method of the year in 2020 and has been getting much attention. Particularly, in a recent spatial genomic study combined with super-high resolution microscopy technique such as expansion microscopy, it was possible to carry out in-situ imaging of 10,000 or more transcripts in a brain section. Still, the imaging was carried out only in some parts of the brain section, or three-dimensional, super-high resolution imaging of transcriptomes has not been generally used yet.

A human brain has around a thousand trillion synapses. Connectomics is the study of comprehensive maps of neural connections to map out how neurons are connected through individual synapses. Generally, in research of connectomics, two-dimensional images of brain tissue sections are reconstructed into three-dimensional ones through electron microscopic imaging using an automatic slicing machine, and then the connections between neurons are analyzed and identified. Incidentally, molecular information on cell type may be lost during the reconstruction of electron microscopic images. However, it is difficult to observe as small structures as synapses using a general microscopy technique with optical diffraction limits that are based on immunostaining in which a particular cell type can be labeled, and there are various types of protein markers that make up the synapses, creating a need for a super resolution multiplexed imaging technique.

The above-mentioned fields of study, in particular, spatial transcriptomics and connectomics, generally require a sequential staining (sequential hybridization) process in order to observe various target molecules. In sequential staining, a fluorescently tagged probe molecule (label, antibody, or DNA probe) is attached to various target molecules such as proteins or transcripts, imaging is performed, and then the probe molecule is detached. Then, another fluorescently tagged probe molecule of the same color or a different color is repeatedly attached to perform imaging. A number of target molecules to be stained with repeated imaging may be color-coded in red-red-yellow, for example. At the same time, fiducial markers acting as a reference are simultaneously imaged in each imaging round. Images produced from every imaging round using these fiducial markers as a point of reference may be registered, and then the color codes of the target molecules are specified. In the end, multiplexed imaging of a number of target molecules is possible. Theoretically, when sequential staining and multiplexed imaging are combined, the imaging capacity of a biological specimen may be defined as follows.

$$\text{Imaging capacity} = (\text{Multiplexing capacity})^{\wedge} (\text{\# of Imaging rounds})$$

where Multiplexing capacity refers to the number of markers or the number of colors that maximizes imaging in each imaging round, and #of Imaging rounds refers to the number of imaging rounds. As described above, an image registration process via sequential staining is necessary in order to perform multiplexed imaging of a number of target molecules. To effectively achieve image registration of a biological specimen over a large area or three-dimensionally, structures that are frequently and uniformly distributed in the biological specimen are used as fiducial markers. Since every biological specimen is made up of cells, the nucleus of a cell stained with DAPI is commonly used as a fiducial marker, or a fluorescent protein may be expressed for a particular cell type and then used as a fiducial marker.

In view of this, the present embodiments propose a technique that can increase the accuracy of image registration up to around 10 nm by using a densely stained structure as a fiducial marker when applying sequential staining to expansion microscopy. In this disclosure, this technique was applied to a cultured cell and a 150 μm-thick brain tissue, which enabled multiplexed imaging using a sequential staining method with three or more imaging rounds. In the case of using a fiducial marker via dense staining such as staining with an NHS-ester molecule that binds to a fluorescent tag targeting amine groups of all proteins within a biological specimen, less image registration errors were made compared to using the nucleus of a cell as a fiducial marker as has been widely used in the conventional art and even three-dimensional image registration was achieved with a registration error as small as 10 nm or so. Moreover, the technology according to the present embodiments was implemented even in specimens where iterative expansion microscopy was applied.

Figure 19:
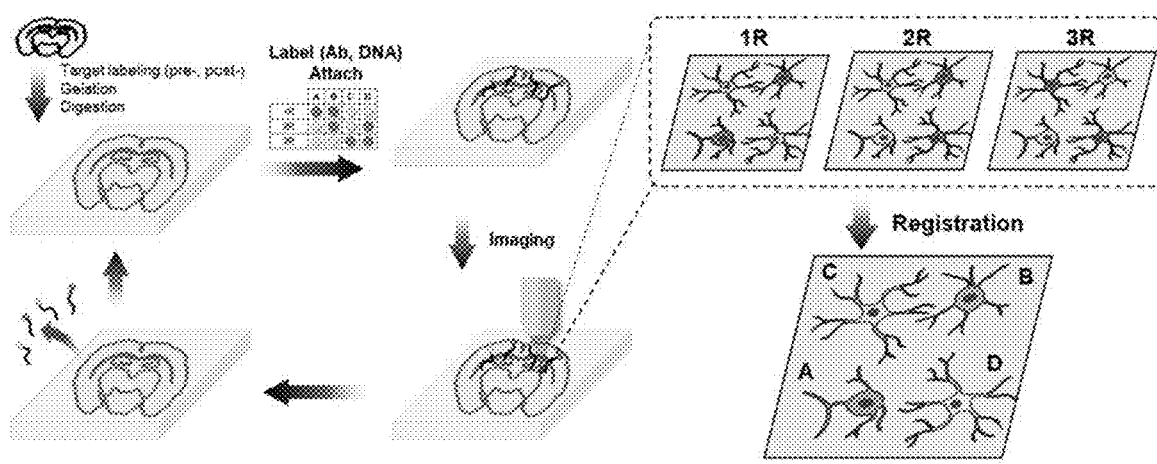
FIG. 19 is a view showing schematic principles of image registration in expansion microscopy.

FIG. 19 is a view showing schematic principles of image registration in expansion microscopy.

Imaging registration may be implemented in various ways on a specimen to which expansion microscopy is applied. Specifically, there are two methods for implementing imaging registration: a pre-gel staining method in which a target molecule is labeled before expanding a specimen; and a post-gel staining method in which a target molecule is labeled after expanding a specimen. Both of the two methods involve performing multiplexed imaging of a specimen where expansion microscopy is applied, by using a sequential staining process, in which fluorophores are repeatedly attached and detached, and image registration. Referring to FIG. 19, labeled target molecules are imaged simultaneously with the nuclei of cells stained with DAPI as fiducial markers or with densely stained intra-cellular structures. Next, all of the fluorescent labels are detached, and then fluorescent labels of the same colors or different colors are attached back to the target molecules, which are then imaged simultaneously with the fiducial markers. Images of the fiducial markers produced from each imaging round are registered first. In the process of registering the images of the fiducial markers from each imaging round, a vector map is extracted by mapping physical deformities in the specimen caused when it is repeatedly placed on a microscope, and non-linear deformities within hydrogel occurring during repeated staining. The images of the target molecules produced from each imaging round are overlaid on the vector map, thereby producing final images with color codes assigned to specific target molecules.

Figure 20:
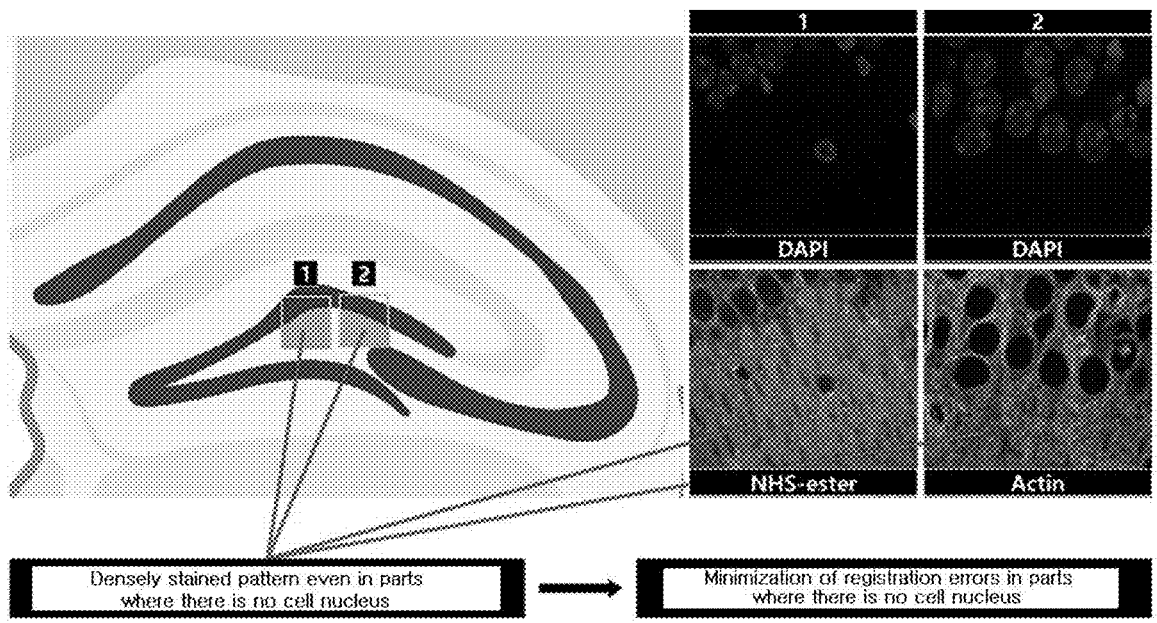
FIG. 20 is a view for making comparisons of density between cellular nucleus signals stained with DAPI in the conventional art and intra-cellular signals stained with an NHS-ester and actin according to third embodiments of the present disclosure.

FIG. 20 is a view for making comparisons of density between cellular nucleus signals stained with DAPI in the conventional art and intra-cellular signals stained with an NHS-ester and actin according to third embodiments of the present disclosure.

As stated above, structures that are frequently and uniformly distributed within a specimen are used as fiducial markers for image registration. Generally, the nucleus of a cell is stained with DAPI and used as a fiducial marker. Incidentally, as illustrated in FIG. 20, cell nuclei are not densely present in the dentate gyrus in a brain section of a mouse. Thus, at some parts of the dentate gyrus where cellular nucleus signal is not strong, it is difficult to accurately map errors in image registration caused by non-linear deformities of the specimen, which may lead to a large error in registration. In view of this, in the present embodiments, nearly every structure within the cell is densely labeled by staining with a fluorescent NHS-ester molecule to label amine groups of all proteins or staining with actin filaments, and then this fluorescent signal is used as a fiducial marker for image registration.

Figure 21:
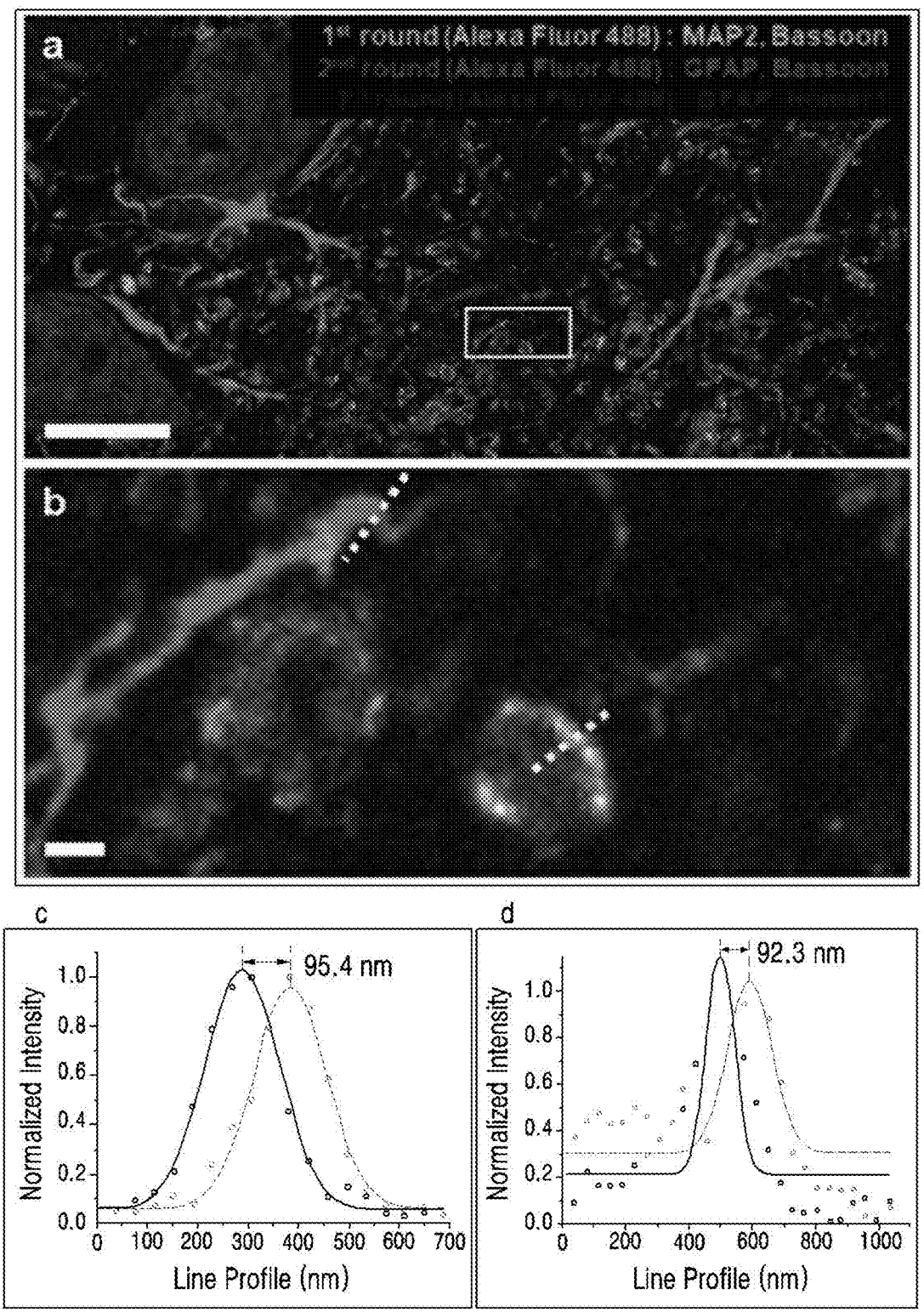
FIG. 21 is a view showing results of imaging in which the nucleus of a cell stained with DAPI is used as a fiducial marker according to the conventional art.

FIG. 21 is a view showing results of imaging in which the nucleus of a cell stained with DAPI is used as a fiducial marker according to the conventional art.

(a) of FIG. 21 is a registration image (scale bar: 10 μm) of an expanded brain section obtained using a DNA conjugated to Alexa Fluor 488 in three imaging rounds, where green indicates MAP2 and bassoon (first imaging round), red indicates GFAP and bassoon (second imaging round), and blue indicates GFAP and Homer1 (third imaging round). In this case, imaging was done using Alexa 488 fluorophores for all of the three imaging rounds, and then image registration was performed using DAPI images produced from each imaging round. (b) of FIG. 21 shows an enlarged image (scale bar: 500 nm) of the rectangular region in (a). In this instance, registration errors of GFAP (red and blue) and bassoon (red and blue) were seen by the naked eye. (c) of FIG. 21 shows a registration error of GFAP protein, and (d) of FIG. 21 shows a registration error of bassoon protein. Referring to FIG. 21, it was discovered that, when sequential staining and image registration were performed by using DAPI as a fiducial marker in a dentate gyrus region where cell nuclei were not densely packed, the bassoon protein as a synaptic marker had a registration error of 90 nm, and GFAP, a typical astrocyte marker for glia cells, also had a registration error of around 90 nm.

Figure 22:
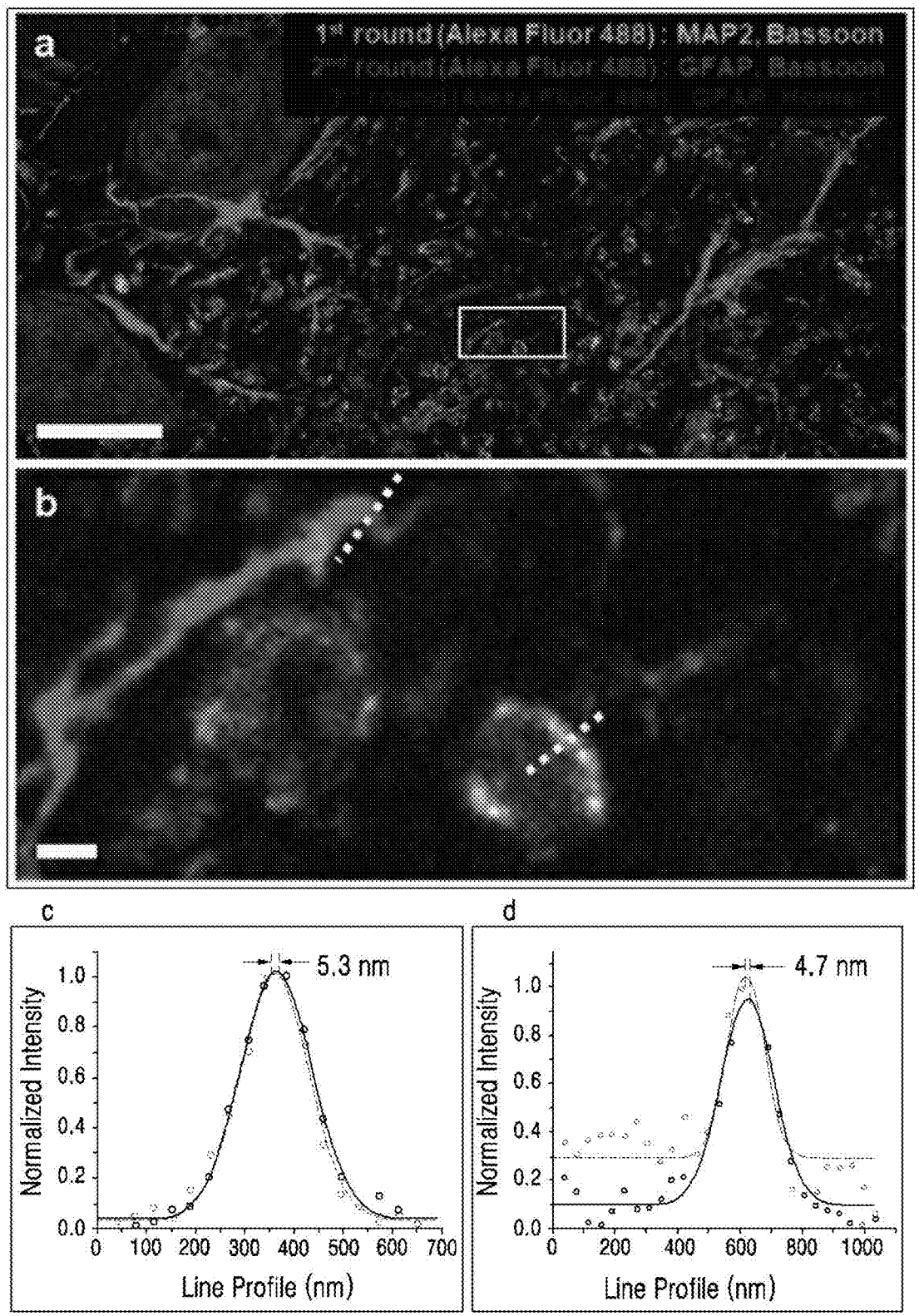
FIG. 22 is a view showing results of imaging in which the inside of a cell stained with an NHS-ester is used as a fiducial marker according to the third embodiments of the present disclosure.

FIG. 22 is a view showing results of imaging in which the inside of a cell stained with an NHS-ester is used as a fiducial marker according to the third embodiments of the present disclosure.

(a) of FIG. 22 is a registration image (scale bar: 10 μm) of an expanded brain section obtained using a DNA conjugated to Alexa Fluor 488 in three imaging rounds, where green indicates MAP2 and bassoon (first imaging round), red indicates GFAP and bassoon (second imaging round), and blue indicates GFAP and Homer1 (third imaging round). In this case, imaging was done using Alexa 488 fluorophores for all of the three imaging rounds, and then image registration was performed using NHS-ester images produced from each imaging round. (b) of FIG. 22 shows an enlarged image (scale bar: 500 nm) of the rectangular region in (a). (c) of FIG. 22 shows a registration error of GFAP protein, and (d) of FIG. 22 shows a registration error of bassoon protein. Referring to FIG. 22, it was discovered that, when image registration was performed by using a structure inside tissue stained with a fluorescent NHS-ester, rather than the nucleus of a cell stained with DAP, was used as a fiducial marker in the same region as in FIG. 21, the same protein markers as in FIG. 21, bassoon and GFAP proteins, had a registration error of around 5 nm.

Figure 23:
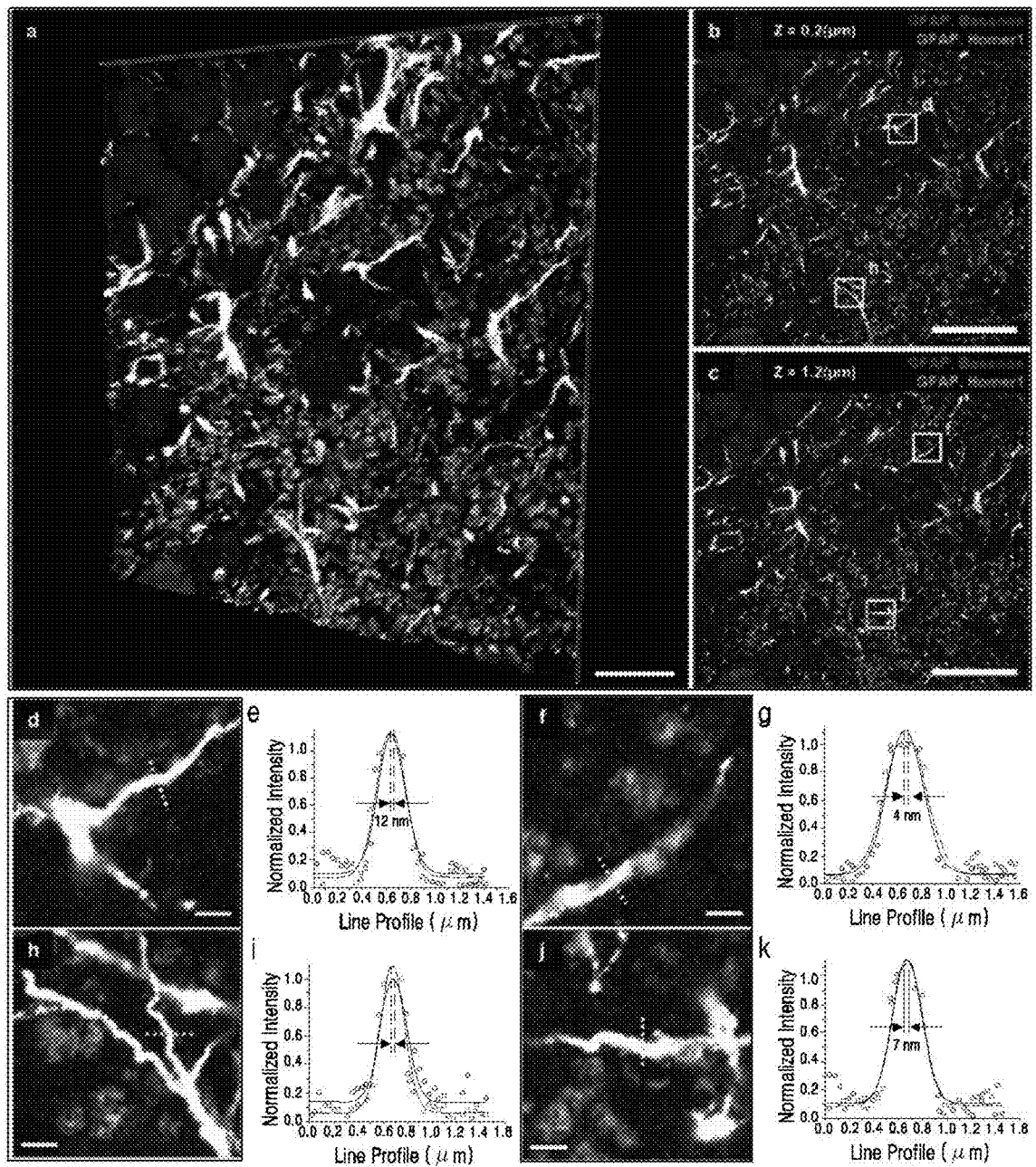
FIG. 23 is a view showing results of imaging using a fiducial marker stained with an NHS-ester according to an embodiment.

FIG. 23 is a view showing results of imaging using a fiducial marker stained with an NHS-ester according to an embodiment.

Referring to FIG. 23, it was found out that, when imaging via sequential staining and image registration were performed by using a molecule stained with a fluorescent NHS-ester as a fiducial marker, image registration was done with higher accuracy compared to using a cell nucleus stained with the existing DAPI. Additionally, in the present embodiments, three-dimensional z-stack images were obtained from a sequentially stained specimen in each imaging round, and the z-stack images obtained from each imaging round were three-dimensionally registered by using a fluorescent NHS-ester molecule-stained signal as a fiducial marker.

In FIG. 23, (a) shows a three-dimensionally registered image (scale bar: 20 μm) of the Z-stack images obtained for two imaging rounds, (b) shows a two-dimensional image (scale bar: 10 μm) registered at z=0.2 μm, (c) shows a two-dimensional image (scale bar: 10 μm) registered at z=1.2 μm, (d), (f), (h), and (j) show enlarged images (scale bar: 1 μm) of GFAP in the rectangular regions, and (e), (g), (i), and (k) show profiles and registration errors of fluorescent signals of GFAP registered for the yellow dotted lines indicated in the enlarged images of (d), (f), (h), and (j). Specifically, as shown in FIG. 23, three-dimensionally registered images were successfully obtained at the volume of 80 μm (x)×80 μm (y)×1.2 μm (z). Also, it was discovered that the registration errors measured for GFAP proteins at different z positions were approximately 10 nm. That is, three-dimensional registration of images of expanded specimens that have undergone sequential staining was successfully done within an image registration error of around 10 nm.

Figure 24:
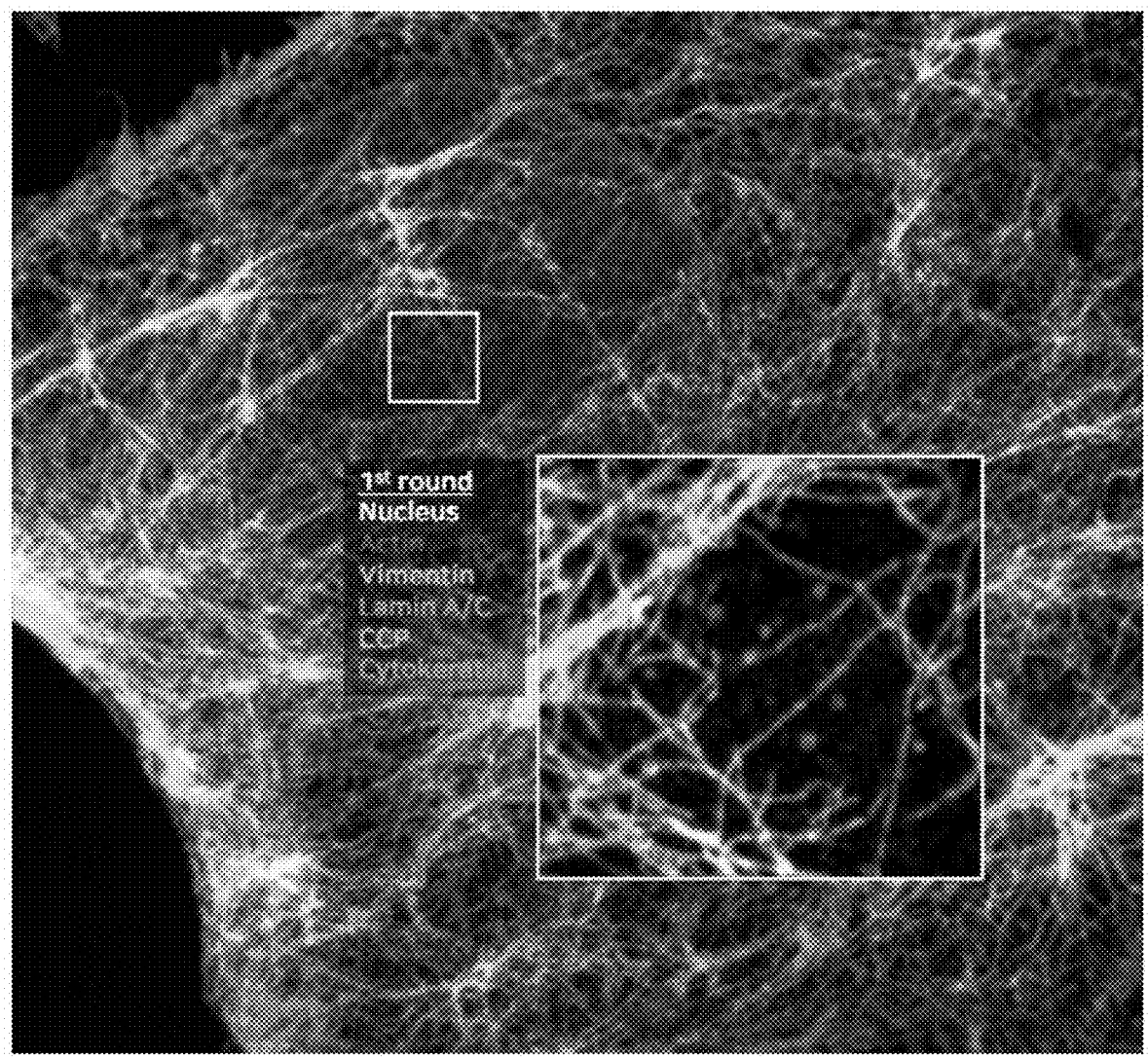
FIG. 24 is a view showing results of imaging using a fiducial marker stained with actin according to another embodiment.

FIG. 24 is a view showing results of imaging using a fiducial marker stained with actin according to another embodiment.

Referring to FIG. 24, it was observed that, when actin filaments present in tissue and cells were stained and then expanded using expansion microscopy, they were as densely stained as NHS-ester molecules. In view of this, as illustrated in FIG. 24, when image registration was performed using a densely-stained signal as a fiducial marker, based on the same principle as image registration using fluorescent NHS-ester molecules, successful image registration was observed. Specifically, image registration of vimentin in an expanded cell specimen stained with actin was performed. Vimentin and CCP obtained in the first imaging round were stained with the same color and images thereof were obtained, and then the vimentin and the CCP were stained with different colors in the second imaging round and then image registration was performed using an actin signal within the cell as a fiducial marker, in which case the vimentin and the CCP had different colors.

Figure 25:
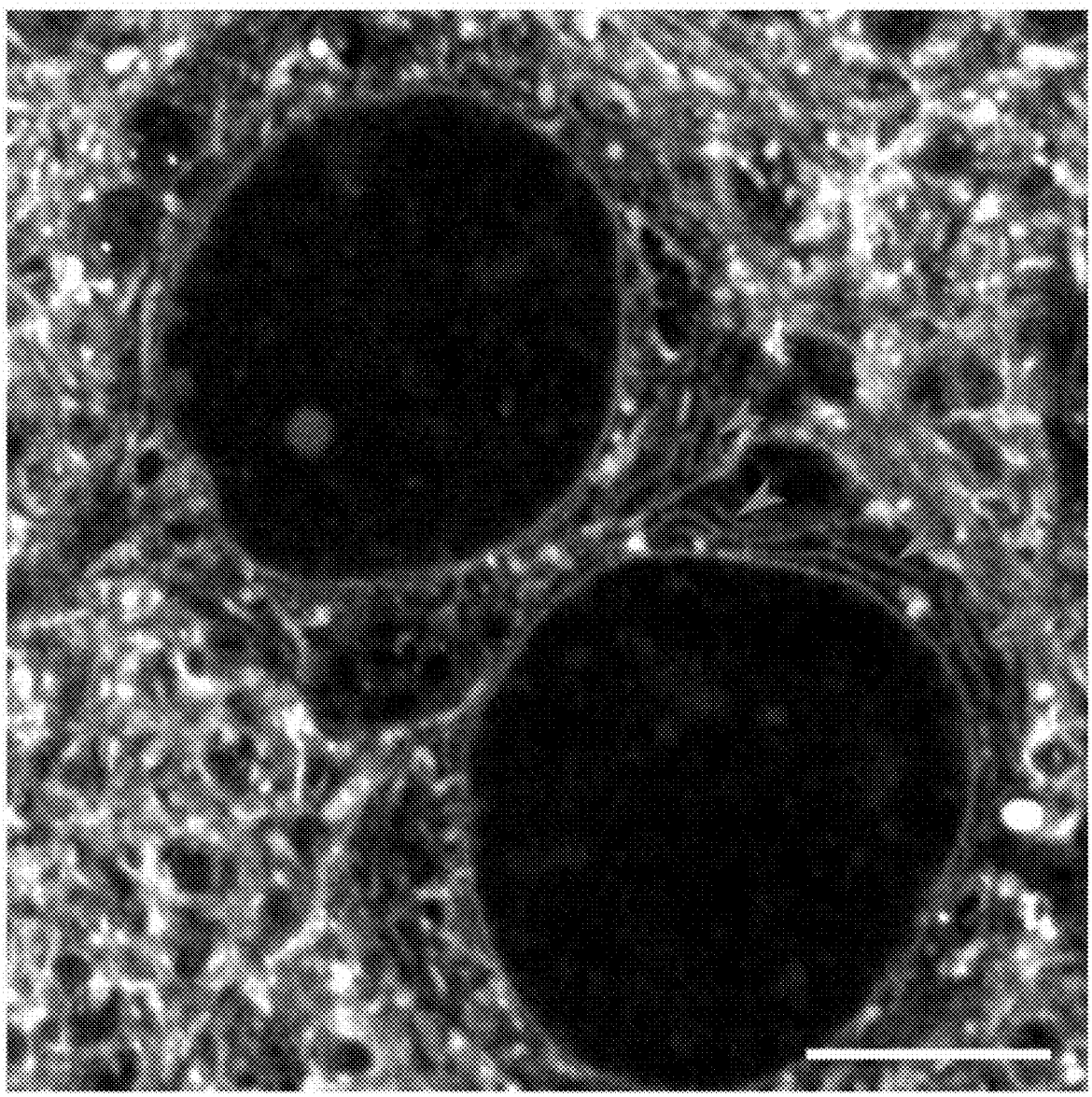
FIG. 25 is a view showing preservation of a fluorescent NHS-ester and an actin-stained signal during a sequential staining process according to the third embodiments of the present disclosure.

FIG. 25 is a view showing preservation of a fluorescent NHS-ester and an actin-stained signal during a sequential staining process according to the third embodiments of the present disclosure.

The point of the technology according to the present embodiments is whether a densely-stained signal of fluorescent NHS-ester molecules or a densely-stained signal of actin is preserved or not during the sequential staining process. In this regard, it was found out that a stained signal of fluorescent NHS-ester molecules and a stained signal of actin were maintained in a specimen with a stained antibody attached to a DNA strand, during a process of repeatedly attaching and detaching DNA. As illustrated in FIG. 7, in spite of the repetitive staining process, that is, repeated imaging rounds and a repetitive process of attaching and detaching a DNA probe, stained signals of cell organelles (indicated by the red arrows) that were presumed to be the Gogi apparatus, the endoplasmic reticulum, and mitochondria remained well, and the actin signal was preserved well too. The process of attaching and detaching DNA is basically the same as a process of attaching a DNA probe for RNA observation, in terms of chemical treatment. This suggests that the technology according to the present embodiments is applicable to image registration and observation via sequential staining of transcripts, as well as observation of proteins via staining of antibody attached to a DNA strand. Moreover, it was found out that a stained signal of fluorescent NHS-ester molecules was preserved during the sequential staining of antibody as well as during the sequential staining of DNA.

Figure 26:
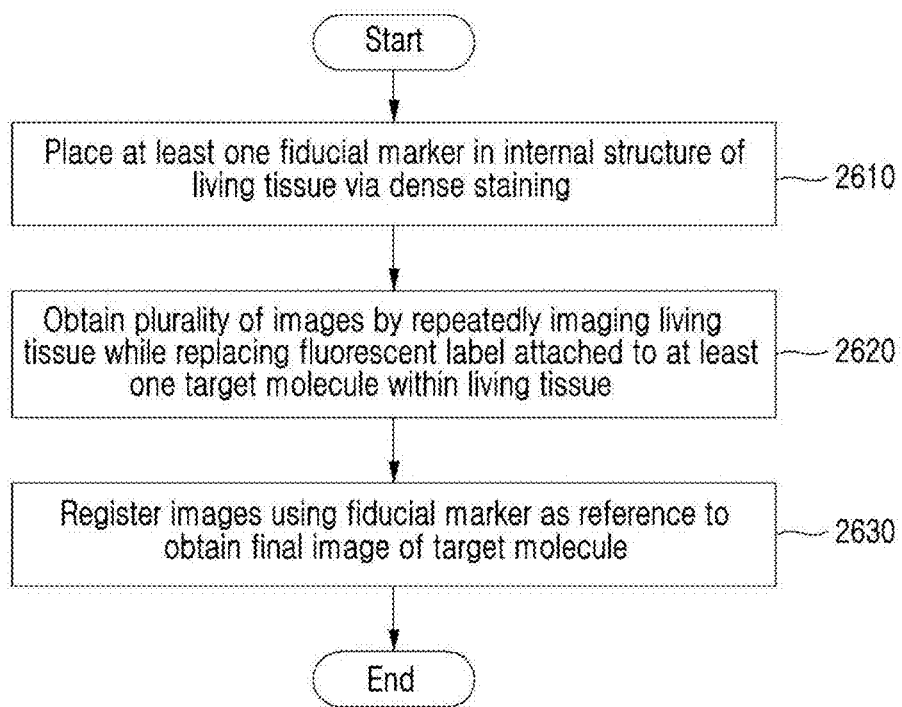
FIG. 26 is a view illustrating three-dimensional image registration and super-resolution multiplexed imaging method using the same according to the third embodiments of the present disclosure.

FIG. 26 is a view illustrating three-dimensional image registration and super-resolution multiplexed imaging method using the same according to the third embodiments of the present disclosure.

Referring to FIG. 26, in step 2610, at least one fiducial marker is placed in an internal structure of a biological sample via dense staining. In this case, the dense staining is applied by using at least either NHS-ester molecules or actin filaments on the internal structure.

Next, in step 2620, a plurality of images are obtained by repeatedly imaging the biological sample while replacing a fluorescent label attached to at least one target molecule within the biological sample where the fiducial marker is placed. In this case, the biological sample is repeatedly imaged in a plurality of imaging rounds to obtain each of the images in each of the imaging rounds. Specifically, a fluorescent label is attached to the target molecule in each of the imaging rounds, the biological sample is imaged to obtain an image, and the attached fluorescent label is separated from the target molecule. Here, the fluorescent labels attached to the target molecule in the imaging rounds are identical or different.

In some embodiments, the biological sample may be expanded from a detected biological specimen. For example, the biological sample may be produced by applying a hydrogel to the biological specimen and expanding the hydrogel. According to one embodiment, the biological sample may be expanded in a first imaging round after a fluorescent label is attached to the target molecule. According to another embodiment, the imaging rounds may be run after the expansion of the biological sample.

Next, in step 2630, the images are registered using the fiducial marker as a reference. Accordingly, a final image of the target molecule is obtained. Specifically, a final image of the target molecule is obtained by overlaying the images using the fiducial marker as a reference.

According to the present embodiments, an image processing apparatus for performing three-dimensional image registration and a super-resolution multiplexed imaging method using the same is implemented.

The third embodiments of the present disclosure may dramatically improve the accuracy of image registration by using a densely stained structure as a fiducial marker, when applying a sequential staining process to expansion microscopy. In other words, various embodiments may achieve an image registration accuracy of around 10 nm by placing fiducial markers for more packed image registration via dense staining in which signal distortion does not occur during repeated antibody and DNA probe labeling. Accordingly, various embodiments allow for effective super resolution multiplexed imaging with improved accuracy.

The staining method of the present embodiments exhibit a densely stained pattern in a biological specimen, and therefore may be used as a fiducial marker for multiplexed imaging and repetitive fluorescence in situ hybridization of nucleic acids. In particular, in the case of dense staining proposed in the present embodiments, decoloring of stained structures was not observed even when exposed to formamide or a high-temperature protein denaturing buffer which is generally used in the process of attaching or detaching an antibody or DNA probe, and high staining density is maintained. Thus, this staining method shows great potential as a fiducial marker. Also, the technique used when observing proteins or nucleic acids during the sequential staining process proposed in the present embodiments is identical to a generally-used immunostaining (immunofluorescence) process or fluorescence in situ hybridization process. Accordingly, it is expected that this technique may be combined with all unmixing techniques including spectral unmixing which is a multiplexed imaging technique based on the existing immunostaining method using fluorescence, and that it also may be combined with seqFISH+ and MERFISH which are techniques for super-resolution multiplexed imaging of nucleic acids.

Since the present embodiments involve a technology that basically minimizes repetitive errors in multiplexed imaging, it is expected that they may be combined with the existing multiplexed imaging technology, enabling observation of multimarkers with a super resolution at least 100 times as high as or higher than the ability of existing optical microscopes to perform multimolecular simultaneous imaging. The present embodiments are applicable to multimolecular imaging of a pathological specimen because the y have no limitations on the applicability of biological specimen. That is, the present embodiments may be applied to pathological specimens obtained by university hospitals, cancer centers, etc., which may allow for collecting pathological data on various biomarkers, and analyzing and incorporating it with data on prognosis and treatment for patients. Moreover, if this data is used to train artificial intelligence, it may be possible to evaluate biopsy specimens actually obtained from patients to determine proper drug treatment. In addition, the present embodiments may allow for integrating differences in structure or protein molecular expression observed within biological specimens since they are capable of super-resolution multiplexed imaging, and therefore it is expected that the use of this database may reduce the development time and cost of new drugs.

It should be appreciated that various embodiments of the disclosure and the terms used therein are not intended to limit the technology disclosed herein to specific forms, and should be understood to include various modifications, equivalents, and/or alternatives to the corresponding embodiments. In describing the drawings, similar reference numerals may be used to designate similar constituent elements. As used herein, singular forms may include plural forms as well unless the context clearly indicates otherwise. In the present disclosure, the expression "A or B", "at least one of A or/and B", or "one or more of A or/and B" may include all possible combinations of the items listed. The expression "a first", "a second", "the first", or "the second" may modify corresponding elements regardless of the order or importance, and is used only to distinguish one element from another element, but does not limit the corresponding elements. When an element (e.g., first element) is referred to as being "(functionally or communicatively) connected," or "coupled" to another element (second element), the element may be connected directly to the another element or connected to the another element through yet another element (e.g., third element).

According to various embodiments, each component (e.g., a module or a program) of the above-described components may include a single entity or multiple entities. According to various embodiments, one or more of the above-described components or steps may be omitted, or one or more other components or steps may be added. Alternatively or additionally, a plurality of components (e.g., modules or programs) may be integrated into a single component. In such a case, the integrated component may still perform one or more functions of each of the plurality of components in the same or similar manner as they are performed by a corresponding one of the plurality of components before the integration. According to various embodiments, steps performed by the module, the program, or another component may be carried out sequentially, in parallel, repeatedly, or heuristically, or one or more of the steps may be executed in a different order or omitted, or one or more other steps may be added.

The embodiments of the invention in which an exclusive property or privilege is claimed are defined as follows:

1. A three-dimensional image registration method comprising:
   placing at least one fiducial marker in an internal structure of a biological sample via dense staining;
   obtaining a plurality of images by repeatedly imaging the biological sample while replacing a fluorescent label attached to at least one target molecule within the biological sample where the fiducial marker is placed; and
   registering the images using the fiducial marker as a reference,
   wherein, in the obtaining of images, the biological sample is repeatedly imaged in a plurality of imaging rounds to obtain each of the images in each of the imaging rounds,
   wherein the biological sample is produced by applying an expandable polymer material to a biological specimen and expanding the expandable polymer material,
   wherein the three-dimensional image registration method further comprises
   in the obtaining of images, extracting a vector map in which both physical deformities in the biological sample caused by repeatedly mounting the biological sample on a microscope, and non-linear deformities within the expandable polymer material caused by repeated replacement of the fluorescent label, are mapped, and
   wherein the registering of the images comprises obtaining a final image of the target molecule by overlaying the images using the fiducial marker and the vector map as a reference.

2. The method of claim 1, wherein the obtaining of images comprises:
   attaching a fluorescent label to the target molecule in each of the imaging rounds;
   imaging the biological sample to obtain an image; and
   separating the attached fluorescent from the target molecule.

3. The method of claim 2, wherein the fluorescent labels attached to the target molecule in the imaging rounds are identical or different.

4. The method of claim 1, wherein the biological sample is expanded in a first imaging round after a fluorescent label is attached to the target molecule.

5. The method of claim 1, wherein, in the obtaining of images, the images are obtained by repeatedly imaging the biological sample while replacing the fluorescent label attached to the target molecule within the biological sample, after the expansion of the biological sample.

6. The method of claim 1, wherein the expandable polymer material is a hydrogel.

7. An image processing apparatus for performing the three-dimensional image registration method of claim 1.

* * * * *